(12) United States Patent
Kellett et al.

(10) Patent No.: US 10,373,261 B1
(45) Date of Patent: Aug. 6, 2019

(54) INSURANCE COVERAGE AND RATING SYSTEM AND METHOD

(71) Applicant: STATE FARM MUTUAL AUTOMOBILE INSURANCE COMPANY, Bloomington, IL (US)

(72) Inventors: Jennifer Criswell Kellett, Bloomington, IL (US); Edward P. Matesevac, III, Normal, IL (US); Kristopher K. Gaudin, Bloomington, IL (US); Rebecca L. Gruen, Bloomington, IL (US); Michael D. Doiron, Baton Rouge, LA (US); Alice Chi, Des Plaines, IL (US); Lee Drinkwater, Rochester, NY (US); Geoff Segal, Chicago, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 607 days.

(21) Appl. No.: 15/071,791

(22) Filed: Mar. 16, 2016

(51) Int. Cl.
*G06Q 40/08* (2012.01)

(52) U.S. Cl.
CPC .................................. *G06Q 40/08* (2013.01)

(58) Field of Classification Search
CPC ...................................................... G06Q 40/08
USPC ............................................................. 705/4
See application file for complete search history.

(56) References Cited

U.S. PATENT DOCUMENTS

| | | | |
|---|---|---|---|
| 2010/0030586 A1* | 2/2010 | Taylor ................... | G06Q 30/02 705/4 |
| 2011/0161116 A1* | 6/2011 | Peak ...................... | G06Q 40/08 705/4 |

* cited by examiner

*Primary Examiner* — Robert R Niquette
*Assistant Examiner* — Liz P Nguyen
(74) *Attorney, Agent, or Firm* — Marshall, Gerstein & Borun LLP

(57) ABSTRACT

An insurance coverage and rating system and method. The system includes one or more data collecting devices collecting telematics data relative to one or more of an automobile, a home, health or at least one social media platform of an insured. An insurance analysis center is communicatively coupled to the one or more data collecting devices and receives telematics data from the one or more data collecting devices. The insurance analysis center determines an insurance rate for one or more of automobile insurance coverage, home insurance coverage, or life insurance coverage based at least in part on the telematics data received. A total insurance policy premium is then calculated by adding at least two of the determined insurance rates for the one or more of the automobile insurance coverage, the home insurance coverage or the life insurance coverage.

23 Claims, 23 Drawing Sheets

INSURANCE COVERAGE AND RATING SYSTEM AND METHOD

FIELD OF TECHNOLOGY

The present disclosure relates generally to systems and methods for determining insurance rates and coverage, and more particularly, to an improved system and method for automatically rating and determining insurance coverage based on telematics data relative to an insured's assets and behaviors.

BACKGROUND

Insurance companies currently insure assets, such as cars, homes, and lives through separate policies. The insurance for each asset is based on distinct characteristics regarding the asset or person/policyholder. For example, the policyholder is charged a premium that is calculated using traditional variables, such as age, gender, and geographic location. Such traditional variables are often out of the insured's control and fail to accurately capture an individual's personal risk.

In addition, the term of an insurance policy is often six months or a year, and is renewed on an annual or semi-annual basis. At each of the renewal times, rates are typically again determined based on the traditional variables at that annual or bi-annual time, and do not account for any of the insured's individual behaviors or specific asset characteristics. Such rates, therefore, also often fail to accurately capture an individual's personal risk, for example.

Further, these conventional methods of annually or semi-annually determining an insurance rate for each individual insurance policy of an insured, such as auto, home, and life, based on traditional variables are complicated and time consuming. In addition, at least for the reasons described above, calculating the insurance rate for each separate policy is typically an inaccurate representation of the one or more assets covered under each separate policy.

BRIEF SUMMARY OF THE DISCLOSURE

One example of the present disclosure includes an insurance coverage and rating system including a communication network and one or more data collecting devices communicatively coupled to the communication network. Each of the one or more data collecting devices has a memory, one or more processors, and a transmitter; and the data collecting devices collect telematics data relative to one or more of an automobile, a home, health or at least one social media platform of an insured. An insurance analysis center is communicatively coupled to one or more data collecting devices and the communication network. The insurance data analysis center has one or more of a processor, a memory, a transmitter, and a receiver. A module stored in the memory of the insurance data analysis center is executable by at least the insurance analysis center processor to: (1) automatically receive telematics data from the one or more data collecting devices in response to activation of the one or more data collecting devices; (2) automatically determine an insurance rate for one or more of automobile insurance coverage, home insurance coverage, or life insurance coverage based at least in part on the telematics data received from the one or more data collecting devices; (3) automatically calculate a total insurance policy premium by adding the determined insurance rates for at least two of the automobile insurance coverage, the home insurance coverage, or the life insurance coverage; and (4) automatically and continuously adjust the calculated total insurance policy premium based on continuously transmitted telematics data from one or more of the activated data collecting devices.

The system may include additional, fewer, or alternate components and functionality, including that discussed elsewhere herein.

Another example of the present disclosure includes an insurance coverage and rating method including activating, via one or more processors, one or more data collecting devices corresponding to one or more of an automobile, a home, health, or at least one social media platform of an insured. The method further includes automatically receiving, via one or more receivers, telematics data from one or more data collecting devices upon activation of the one or more data collecting devices, the telematics data corresponding to one or more of the insured's automobile, home, or health. The method also include automatically determining, by one or more processors, an insurance rate for one or more of automobile insurance coverage, home insurance coverage, or life insurance coverage based at least in part on the telematics data received. Lastly, the method includes automatically calculating, by one or more processors, a total insurance policy premium by adding the determined insurance rates for at least two of the automobile insurance coverage, the home insurance coverage, or the life insurance coverage.

Yet another example of the present disclosure includes an insurance coverage and rating system including a communication network and an insurance data analysis center communicatively coupled to the communication network. The insurance data analysis center has one or more of a processor, a memory, a transmitter, and a receiver. A module is stored in the memory of the insurance data analysis center and is executable by at least the insurance data analysis center processor to: (1) automatically receive telematics data relative to one or more of an automobile, a home, or health of an insured; (2) automatically determine an insurance rate for one or more of automobile insurance coverage, home insurance coverage, or life insurance coverage based at least in part on the telematics data received from one or more data collecting devices corresponding to one or more of the insured's automobile, home or health; (3) automatically calculate a total insurance policy premium by adding the determined insurance rates for at least two of the automobile insurance coverage, the home insurance coverage, or the life insurance coverage; and (4) automatically and continuously adjust the calculated total insurance premium based on continuously transmitted telematics data.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawings arrangements which are presently discussed, it being understood, however, that the present examples are not limited to the precise arrangements and instrumentalities shown, wherein.

The Figures depict preferred examples for purposes of illustration only. One of ordinary skill in the art will readily recognize from the following discussion that alternative examples of the systems and methods illustrated herein may be employed without departing from the principles of the invention described herein.

DETAILED DESCRIPTION OF THE DISCLOSURE

The present disclosure is generally directed to an insurance coverage and rating system that uses telematics data relative to one or more of an insured's home, automobile, and/or health activities. The telematics data is used to determine insurance rates for various insurance coverages, and then a single total insurance policy premium combining the determined rates for the multiple coverages is calculated. The system allows the insured to have significantly more control over insurance rates and coverage based on telematics data relative to the insured's behavior and the condition and treatment of the insured's assets, e.g., automobile and home.

More specifically, and in one example, the system includes one or more data collecting devices that collect the telematics data relative to one or more of the insured's automobile, home, or health activities. Some example data collecting devices include an in-drive device for an automobile, a wearable digital fitness product, a thermostat, an energy meter, and a home alarm or security system. An insurance analysis center receives the telematics data from the one or more data collecting devices via a communication network and uses the telematics data to automatically determine an insurance rate for one or more of the automobile, home or life insurance coverages. The total insurance policy premium is then calculated by adding the determined insurance rates for at least two of the automobile, home, and/or life insurance coverages. The insured is able to customize the rates and single policy by activating the one or more data collecting devices and selecting, reducing or eliminating insurance coverage through a user control device, such as a smart phone or tablet.

Figure 1:
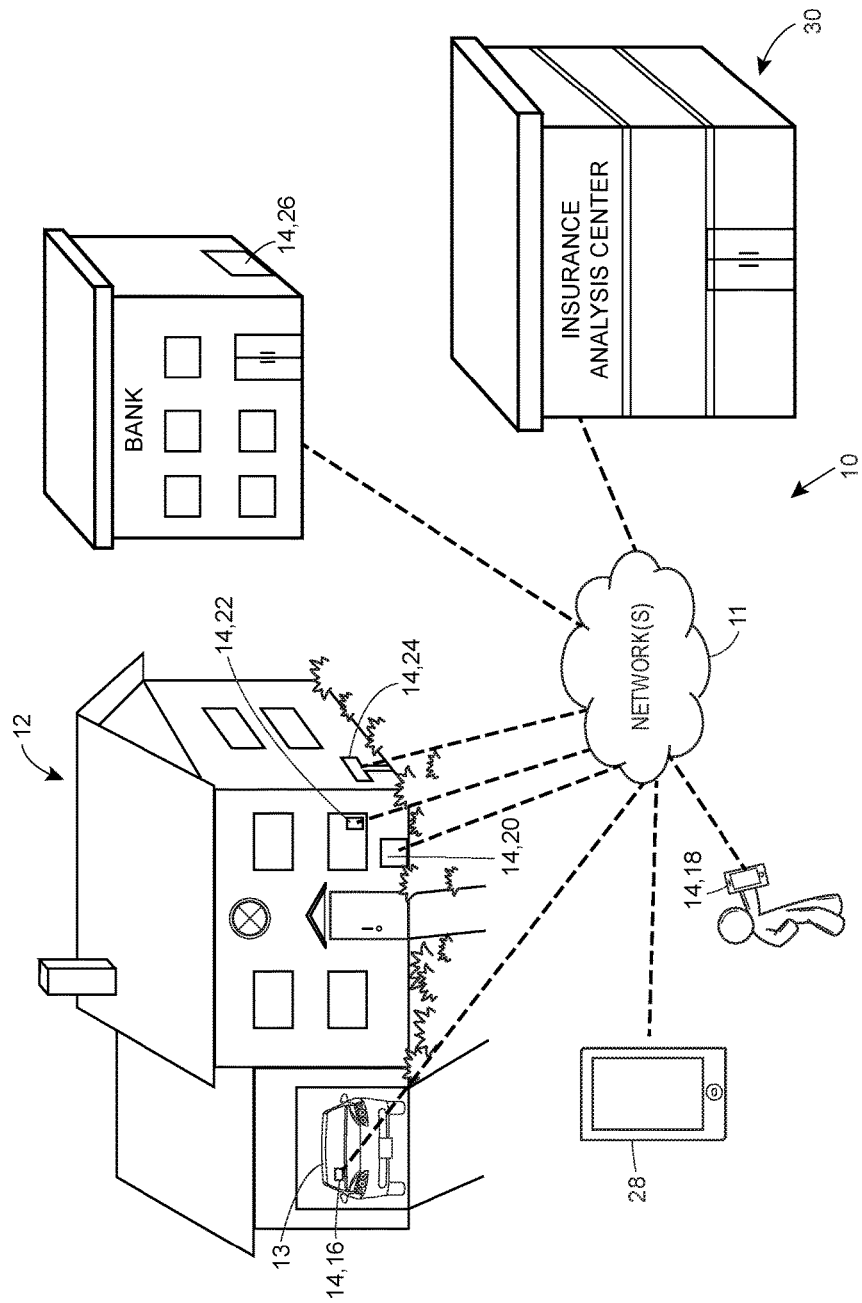
FIG. 1 is a perspective view of an insurance coverage and rating system according to one example of the present disclosure.

Referring now to FIG. 1, an insurance coverage and rating system 10 according to an aspect of the present disclosure is depicted. The insurance coverage and rating system 10 includes a communication network 11 and one or more data collecting devices 14 communicatively coupled to the communication network 11, as described more below. Each of the data collecting devices 14 collects telematics data relative to one or more of a home 12, an automobile 13, banking records 15, and/or health of the insured.

For example, and as one of ordinary skill in the art will appreciate, the data collecting device 14 may include an in-drive device 16 for the insured's automobile 13. As explained more below, the in-drive device 16 can collect telematics data about the braking, accelerating, and turning patterns of the automobile 13. In addition, the data collecting device 14 may include one or more devices capable of collecting telematics data about the insured's exercising activity, sleeping patterns, heart health, and diet. For example, the data collecting device 14 may include a wearable digital fitness product, such as a FitBit or similar device.

In another example, the one or more data collecting devices 14 include devices capable of collecting telematics data about the condition and use of assets in the insured's home 12. Such data collecting devices 14 include, for example, an alarm or security system 20, a thermostat 22, and an energy meter 24. One of ordinary skill in the art will understand that such example data collecting devices 14 relative to the insured's assets may include various other data collecting devices and not depart from the scope of the present disclosure.

In yet another example, the one or more data collecting devices 14 includes a data collecting device corresponding to the insured's banking records 26 at the bank 15. As explained more below, the data collecting device for the insured's banking records 26 may collect telematics data relative to the insured's bill payments, open lines of credit, number of accounts, and amount of debt owed, for example.

In another example, the one or more data collecting devices 14 includes a user control device 28. As explained more below, the user control device 28 may include one or more of a smart phone, a tablet, a personal computer, a laptop, an iPad, a kindle or any other type of e-reader, or any other electronic device capable of supporting at least one social media platform. The at least one social media platform may include, but is not limited to, Twitter, Facebook, Instagram, and/or LinkedIn. As explained more below, data that may be predictive of risk related to one or more of home, life, health or automobile insurance may be collected from indirect sources such as one or more of the foregoing social media platforms via the user control device and then applied to determine an insurance rate.

As further depicted in FIG. 1, and in one example, the insurance coverage and rating system 10 further includes the user control device 28, which is communicatively coupled to the one or more data collecting devices 14, 16, 18, 20, 22, 24, and 26 and the communications network 11. The insured can activate the one or more data collecting devices 14, 16, 18, 20, 22, 24, 26, 28 via the user control device 28, such that telematics data is used to determine insurance rates for a given coverage, as explained more below. Said another way, the user control device 28 may be both a data collecting device, e.g., such as a smart phone that collects and applies data relative to social media platforms of the insured, and a control device that may activate the one or more data collecting devices 14, 16, 18, 20, 22, 24, 26, and 28 described above.

Still further, the insurance coverage and rating system 10 also includes an insurance analysis center 30 that is communicatively coupled to the one or more data collecting devices 14, 16, 18, 20, 22, 24,26, and 28 and the communication network 11. The insurance analysis center 30 receives the data, such as telematics data, collected from one or more of the activated data collecting devices 14, 16, 18, 20, 22, 24, 26, and 28.

Figure 2:
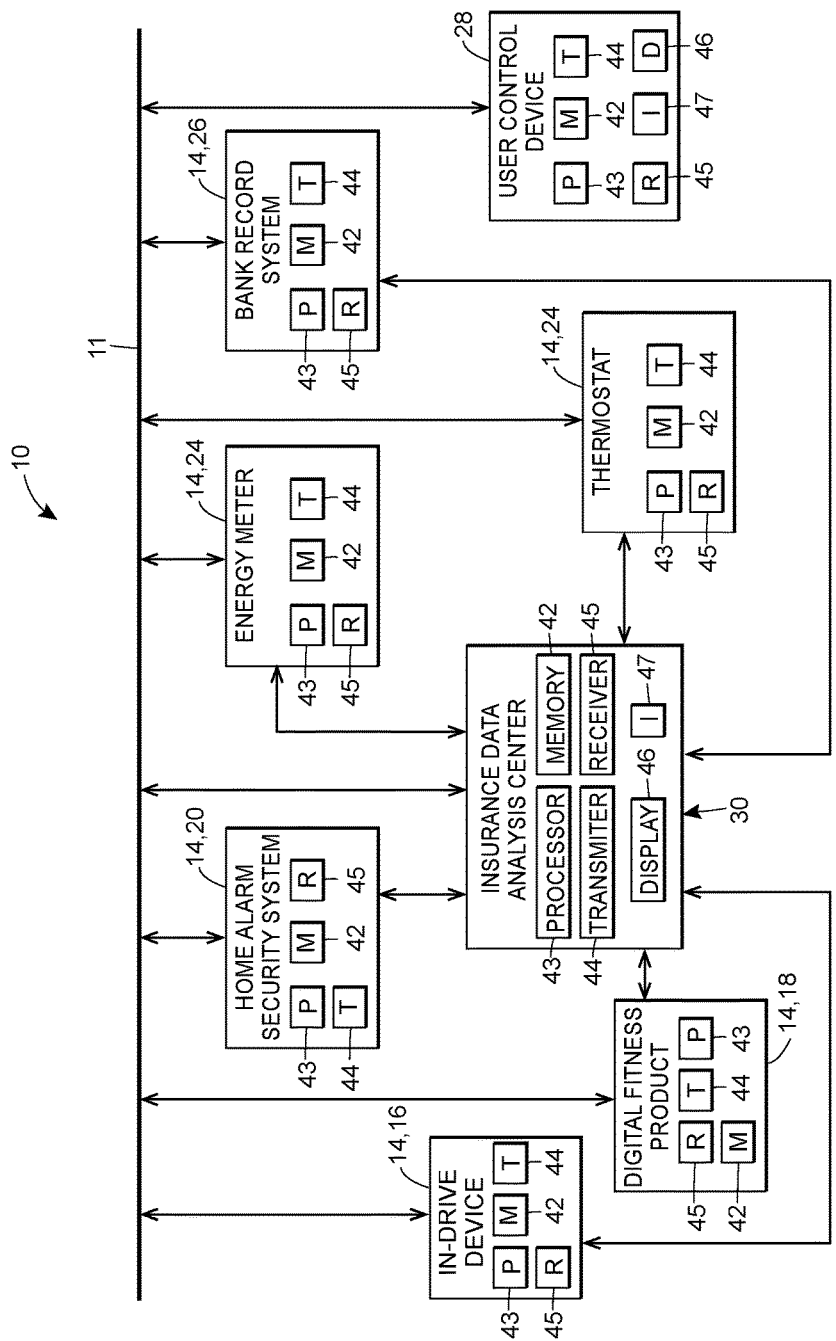
FIG. 2 is a block diagram of the insurance coverage and rating system of FIG. 1.

Referring now to FIG. 2, each of the data collecting devices 14, including the in-drive device 16, the digital fitness product 18, the home security system 20, the thermostat 22, the energy meter 24 and the bank record system 26 includes: (1) a memory 42; (2) one or more processors 43; (3) a transmitter 44; and (4) a receiver 45. In a similar manner, and as further depicted in FIG. 2, each of the user control device 28 and the insurance analysis center 30 also includes a memory 42, one or more processors 43, a transmitter 44, and a receiver 45. The user control device 28 and the insurance analysis center 30 each further includes a display 46 and a network interface 47.

In one example, a module stored in the memory 42 of the insurance data analysis center 30 is executable by at least the processor 43 of the insurance data analysis center 30 to automatically receive telematics data from one or more data collecting devices 14 in response to activation of the one or more data collecting devices 14. The insurance data analysis center 30 then automatically determines an insurance rate for one or more of automobile insurance coverage, home insurance coverage, and life insurance coverage based at least in part on the telematics data received from the one or more data collecting devices 14. The insurance data analysis center 30 then automatically calculates a single total insurance policy premium by adding determined insurance rates for at least two of the automobile insurance coverage, the home insurance coverage, and the life insurance coverage. As long as the data collecting devices 14 are activated by the user control device 28, the insurance data analysis center 30 will continue to receive the telematics data from the one or more data collecting devices 14 and continuously adjust the calculated total insurance policy premium based on the continuously transmitted telematics data.

More specifically, the insurance data analysis center 30 continuously adjusts the calculated total insurance policy premium 90 at constant intervals of time until the one or more data collecting devices 14 is deactivated. For example, the continuously adjusting may include adjusting one or more of every second, every 10 seconds, every 30 seconds, every minute, every hour or any other number of seconds, minutes or hours, provided the interval between each time the calculated total insurance policy premium is adjusted is constant.

In a similar manner, the continuously transmitted data, such as telematics data, is continuously transmitted by the one or more activated data collecting devices 14 at constant intervals of time until the one or more data collecting devices 14 is deactivated. For example, the continuously transmitted data may include transmitting one or more of every second, every 10 seconds, every 30 seconds, every minute, every hour or any other every number of seconds, minutes or hours, provided the interval between each time the telematics data is transmitted is constant.

Figure 3:
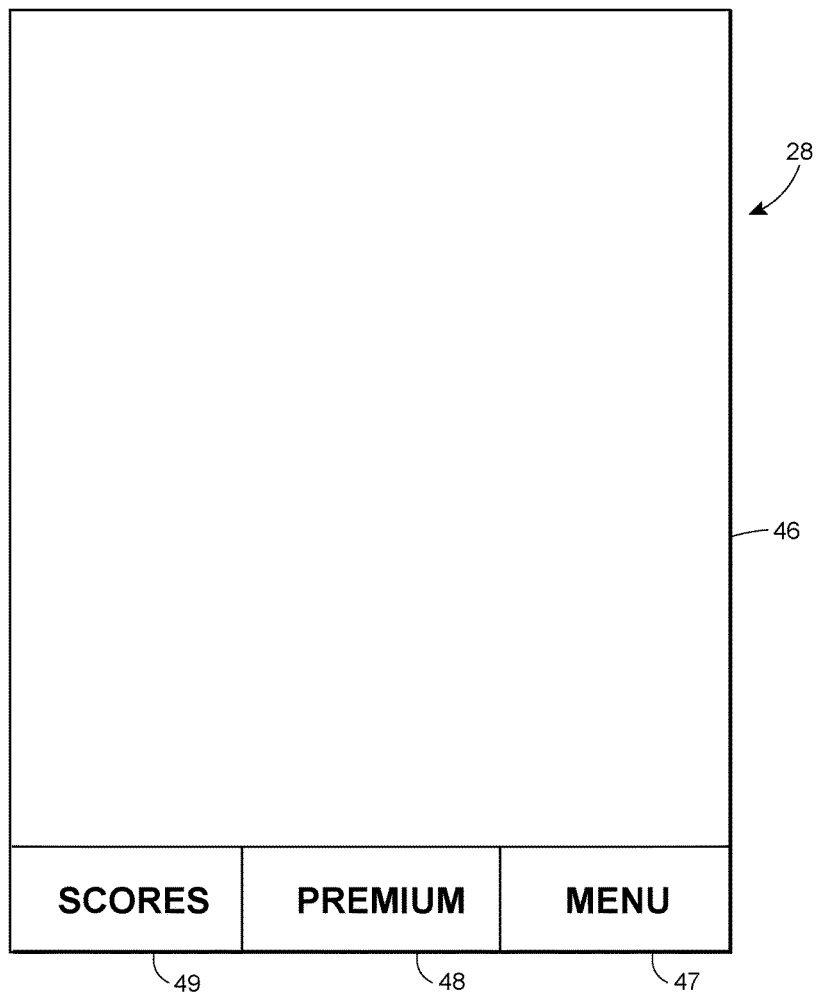
FIG. 3 is front view of a user control device of the insurance coverage and rating system of FIG. 1.

Referring now to FIG. 3, the user control device 28 is depicted. While the user control device 28 depicted in FIG. 3 is a smart phone, the user control device 28 may alternatively include a tablet, a personal computer, a laptop, an iPad, a kindle or any other type of e-reader, or other electronic device capable of sending a command to one or more data collecting devices 14 to activate the one or more data collecting devices 14. For example, an insured may operate the user control device 28 to activate only one of the in-drive device 16, the digital fitness product 18, the home security system 20, the thermostat 22, the energy meter 24 and the bank record system 26. In another example, more than one of the various data collecting devices 14 may be activated by the insured via the user control device 28 to allow telematics data relative to several of the insured's assets, for example, to be collected and transmitted to the insurance data analysis center 30.

As depicted in FIG. 3, the display 46 of the user control device 28 may initially depict three selections for the insured and/or user. The selection options include a menu button, a premium button, and a scores button. While the buttons, such as a small touchscreen area within the display 46, may be disposed on a bottom area on the display 46, as illustrated in FIG. 3, one of ordinary skill in the art will understand that such buttons may be disposed in any area of the display 46 and still fall within the scope of the present disclosure. More specifically, a user, via one or more of a touch screen or a stylus, for example, may select one of three options on the display screen to begin to selectively control his or her insurance coverage and rates based on the care and condition of his or her assets and physical behavior.

Figure 4:
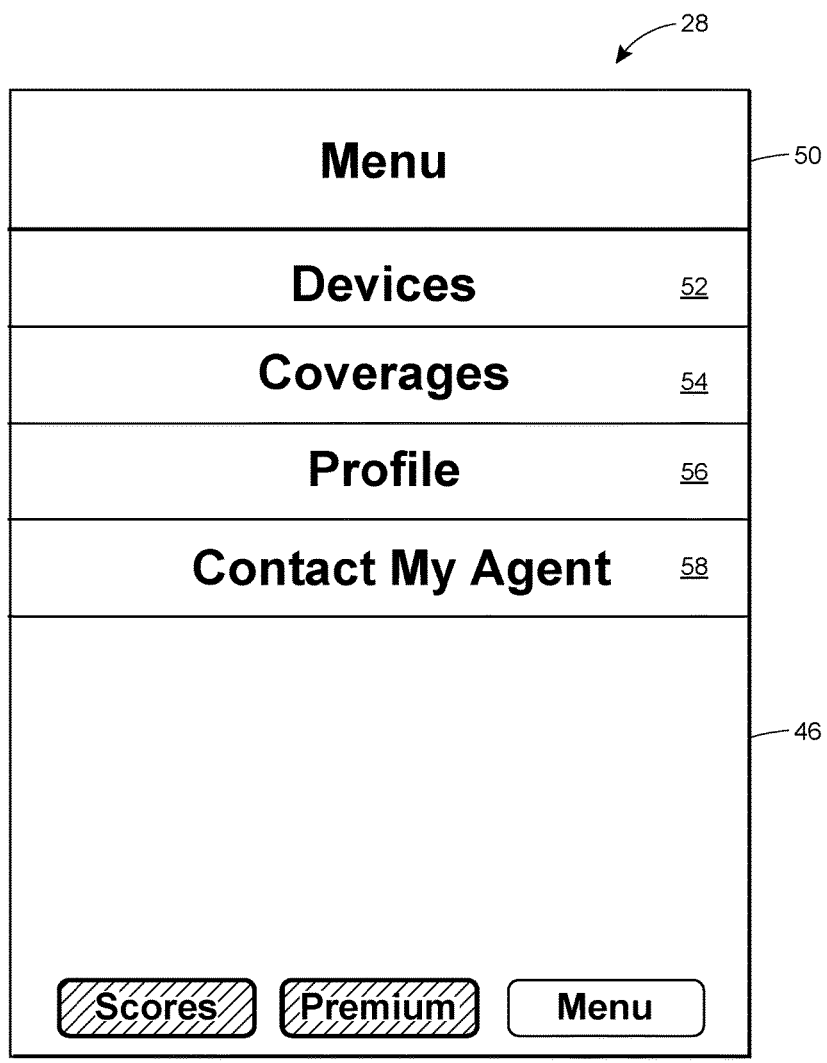
FIG. 4 is another front view of the user control device of the insurance coverage and rating system of FIG. 1, the user control device displaying a menu of selections to control insurance coverage and ratings.

Referring now to FIG. 4, upon selection of the menu button in FIG. 3, a menu 50 appears on the display screen 46. The menu 50 includes a listing of options a user may select via touching the displayed option on the screen with one's finger and/or a stylus, for example. The listing of options includes devices 52, insurance coverages 54, profile 56, and contact my agent 58. In one example, the devices 52 option is a listing of devices capable of being activated, and the insurance coverages 54 option is a listing of the insurance coverages capable of being adjusted. The profile option 56 is a listing of personal information of the insured that may be changed and/or updated, if/as needed. Lastly, the contact my agent 58 option is a listing of agents corresponding to each of the insurance coverages; such agents may then be easily contacted should a phone conversation, for example, be desired.

Figure 5:
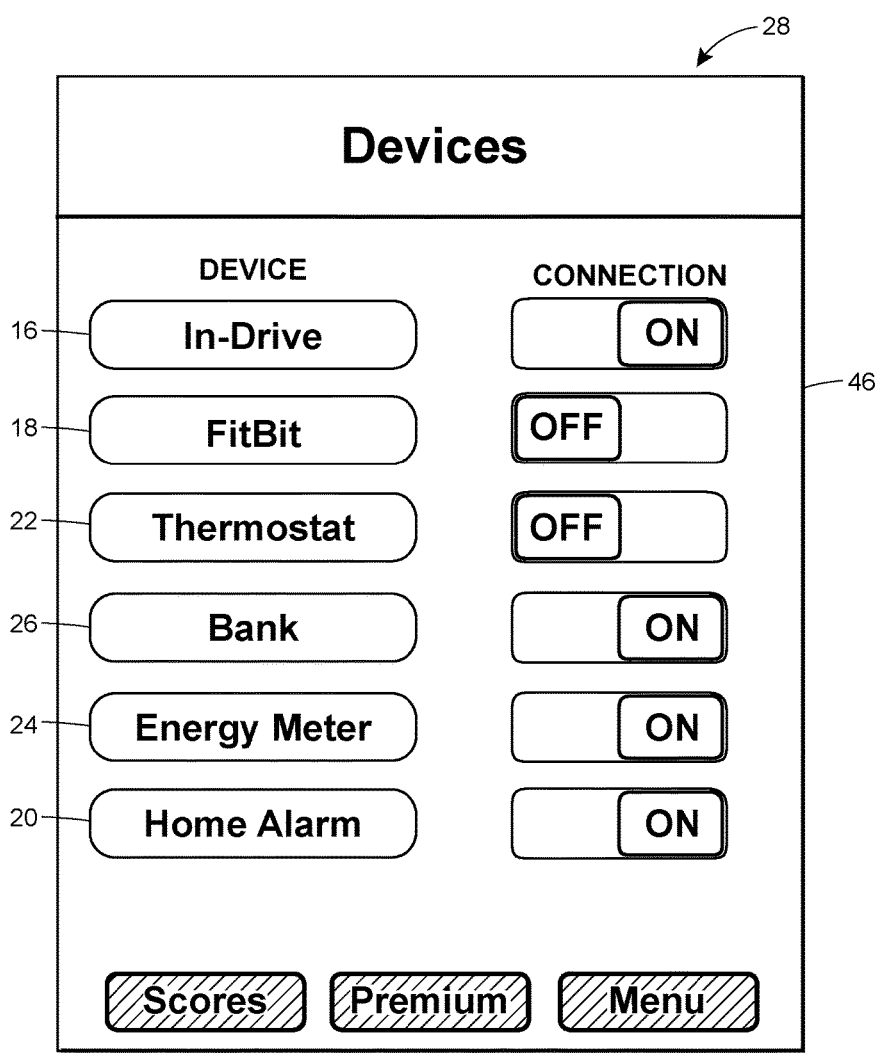
FIG. 5 is another front view of the user control device of the insurance coverage and rating system of FIG. 1, the user control device displaying an exemplary listing of data collecting devices capable of being activated.

More specifically, upon selection of the devices 52 option, a listing of the one or more data collecting devices 14 will be displayed for activation, as depicted in FIG. 5. In one example, the one or more data collecting devices 14 include the In-Drive device 16, the FitBit 18, the thermostat 22, the bank 26, the energy meter 24 and the home alarm system 20 of the insured. To activate one or more of the data collecting devices, the user moves the on/off button adjacent to the listed data collecting device 14 to the on position, for example. When deactivation is desired, the user moves the on/off button to the off position.

Figure 6:
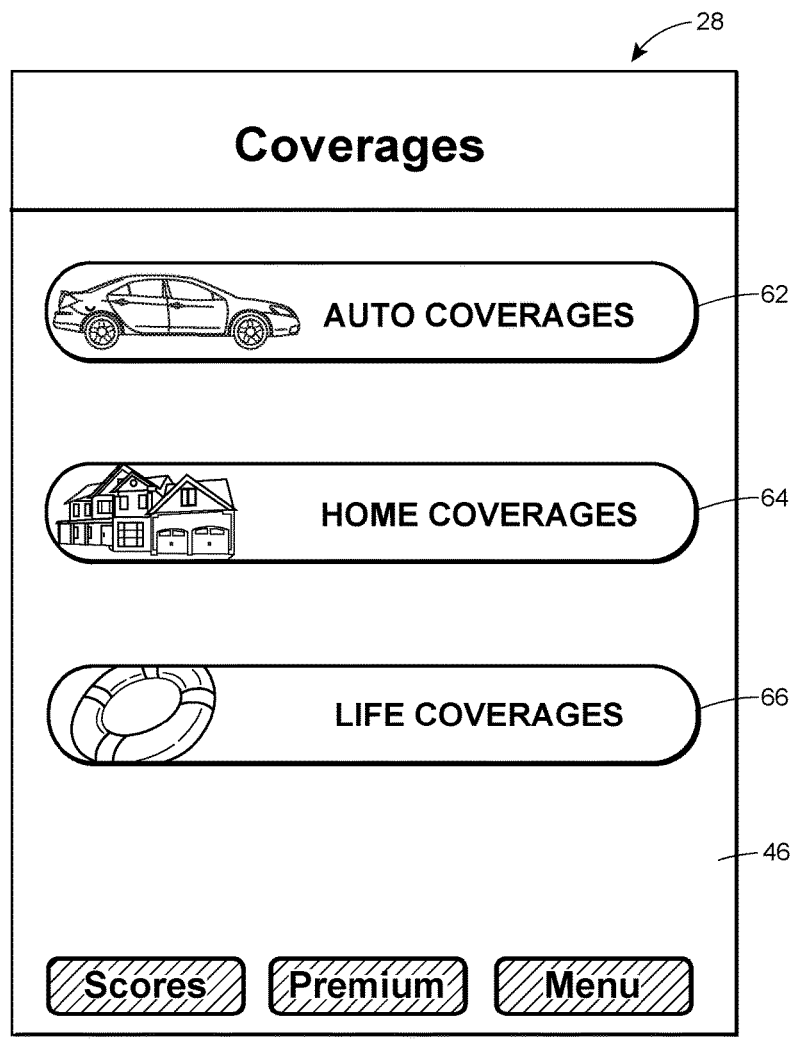
FIG. 6 is another front view of the user control device of the insurance coverage and rating system of FIG. 1, the user control device displaying a listing of insurance coverages capable of being selected.

Referring now to FIG. 6, upon selection of the coverages 54 option (FIG. 4), a listing of the insured's coverages is displayed. The listing of insurance coverages may include, but is not limited to, automobile insurance coverage 62, home insurance coverage 64, and life insurance coverage 66. Upon selection of the automobile insurance coverage 62 listing, specific options relative to the amount of automobile insurance coverage are provided, as depicted in FIG. 7.

Figure 7:
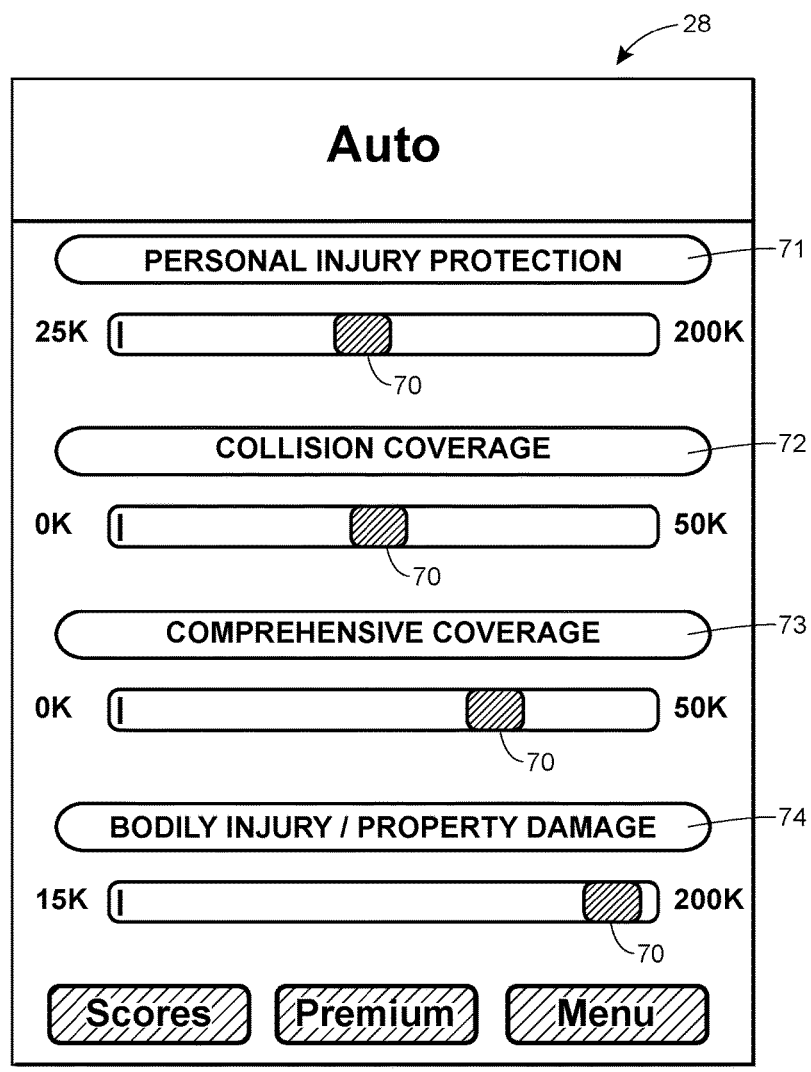
FIG. 7 is another front view of the user control device of the insurance coverage and rating system of FIG. 1, the user control device displaying a list of automobile insurance coverage options.

More specifically, and referring now to FIG. 7, in one example available amounts of insurance coverage ranging from $0 to $200,000 is listed for one or more of personal injury protection 71, collision coverage 72, comprehensive coverage 73, and bodily injury/property damage coverage 74, as depicted in FIG. 7. In addition, under each of the personal injury protection listing, collision coverage listing, comprehensive coverage listing, and bodily injury/property damage coverage listing is a movable button 70 capable of being moved to the lowest coverage value offered to the highest coverage value offered. Of course, any other value between the lowest and highest values of coverages available may also be selected. Practically speaking, this allows an insured to have day-to-day control over an amount of coverage desired depending upon the insured's activities for a given period of time. For example, should the insured know he or she will not be using his car for a one month period of time, the insured may reduce any of the coverages listed on the display of his or her user control device (e.g., FIG. 7) to a lower amount to obtain a reduced total insurance policy premium for that desired period of time.

Figure 8:
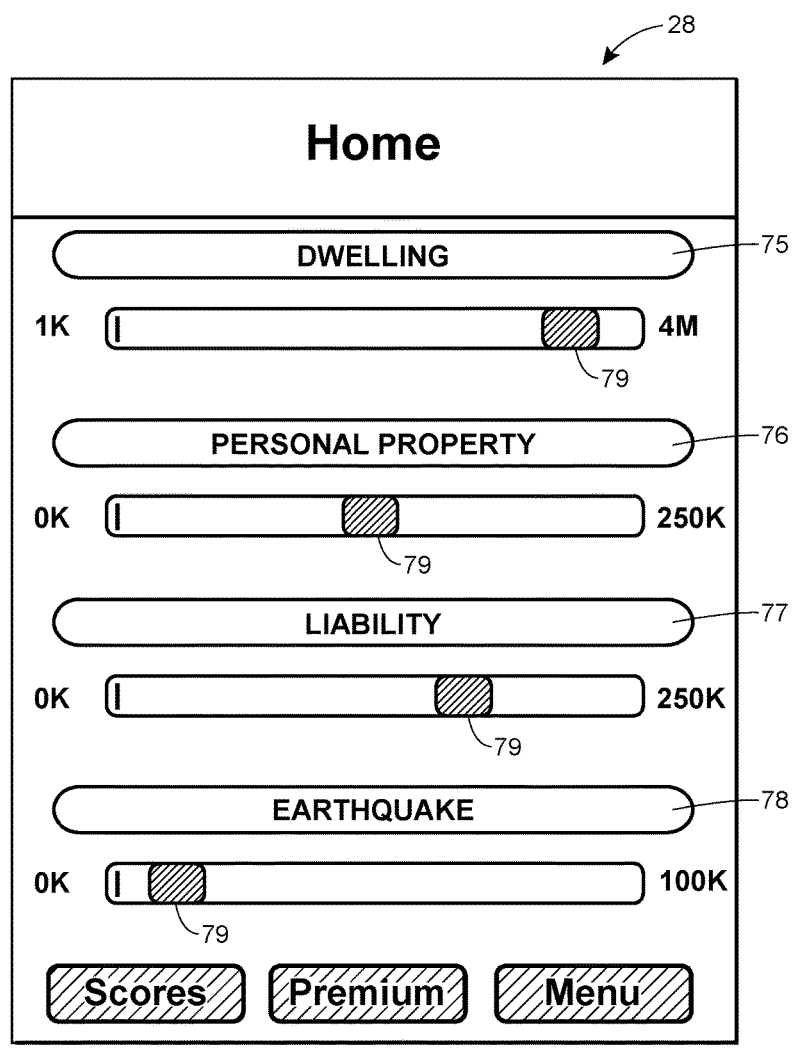
FIG. 8 is another front view of the user control device of the insurance coverage and rating system of FIG. 1, the user control device displaying a list of home insurance coverage options.

Referring now to FIG. 8, upon selection of the home insurance coverages 64 (FIG. 6), specific options relating to the amount of home insurance coverage are provided. For example, and like the options provided for the automobile insurance coverages 62, available amounts of insurance coverage ranging from $0 to $4,000,000 are listed for dwelling coverage 75. Available amounts of insurance coverage ranging from $0 to $250,000 are listed for both personal property coverage 76 and liability coverage 77. In addition, available amounts of insurance coverage ranging from $0 to $100,000 are listed for earthquake coverage 78, in this example.

Further, and like the listing of automobile insurance coverages in FIG. 7, under each of the dwelling coverage listing, the personal property coverage listing, the liability coverage listing, and the earthquake coverage listing is a button 79. A user, e.g., the insured, may move the button 79 to the lowest coverage value offered, e.g., $0, the highest coverage offered, e.g., $4,000,000, or any amount provided between the highest and lowest coverage values. For example, should the insured not be living in his or her home for a known period of time, the insured may reduce the dwelling insurance coverage by moving the button 79 on his or her user control device 28 to a more accurate insurance coverage needed for that period of time. In another example, if the insured is removing some personal property items from his or her home, the insured may reduce the personal property insurance coverage by moving the button 79 on his control device 28 to a lower coverage amount to obtain a reduced and more accurate total insurance policy premium.

Figure 9:
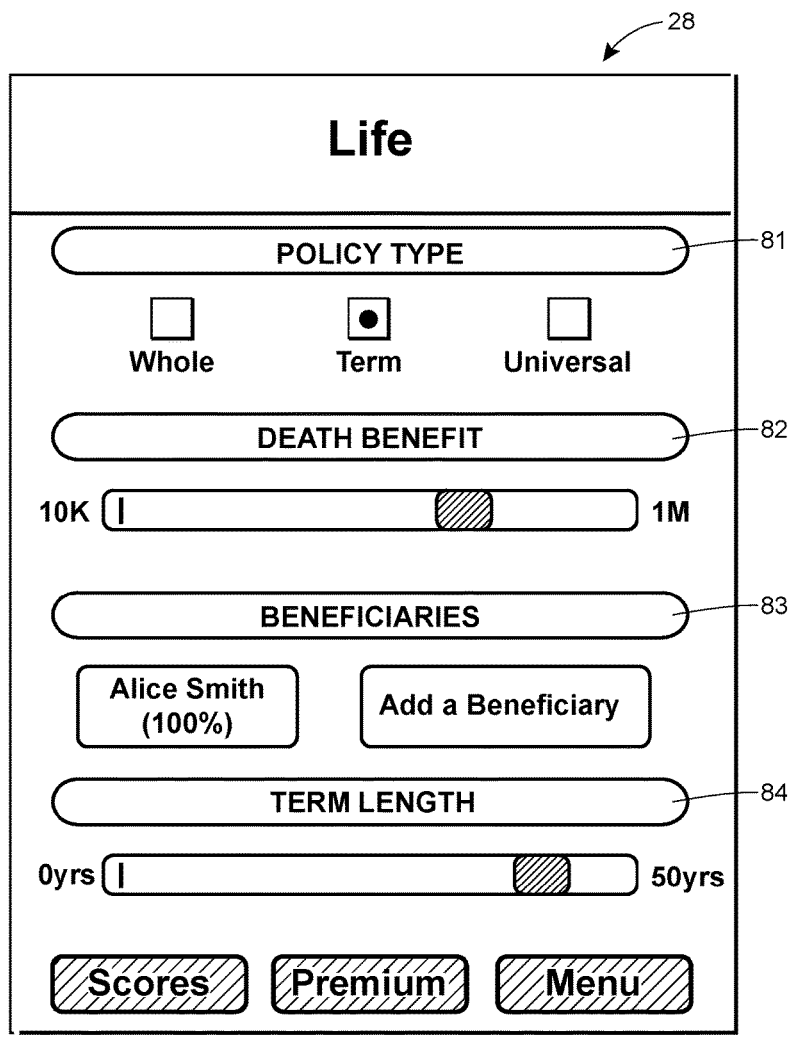
FIG. 9 is another front view of the user control device of the insurance coverage and rating system of FIG. 1, the user control device displaying a list of life insurance coverage options capable of being adjusted by the insured.

Referring now to FIG. 9, upon selection of the life insurance coverages 66 (FIG. 6), options relating to the amount of life insurance coverage are provided. For example, a policy type listing 81 is provided, and the options under the policy type listing 81 are: whole life insurance, term life insurance, and universal life insurance. As such, the insured is able to select via the display of his or her user control device 28 the type of life insurance policy desired. Should something change, the insured can easily update the type of life insurance desired through this displayed listing on his or her user control device 28, e.g., move the policy type to whole life insurance. This allows for better control of desired life insurance coverage and more accurate calculation of the total insurance policy premium.

In addition, similar to the options provided for the automobile insurance coverages 62, available amounts of life insurance coverage ranging from $10,000 to $1,000,000 are listed for death benefit coverage 82. In addition, a beneficiaries listing 83 is provided, and the user can add or remove one or more beneficiaries along with a percentage amount of the amount of the death benefit received, should the life insurance policy be used. Lastly, a term length listing 84 is also provided, and a range of years starting with 0 years and up to 50 years is provided. The user, e.g., insured, may select and/or change the term length at any time to adjust the life insurance coverage and, ultimately, the total insurance policy premium calculated, obtaining a more accurate insurance premium.

Figure 10:
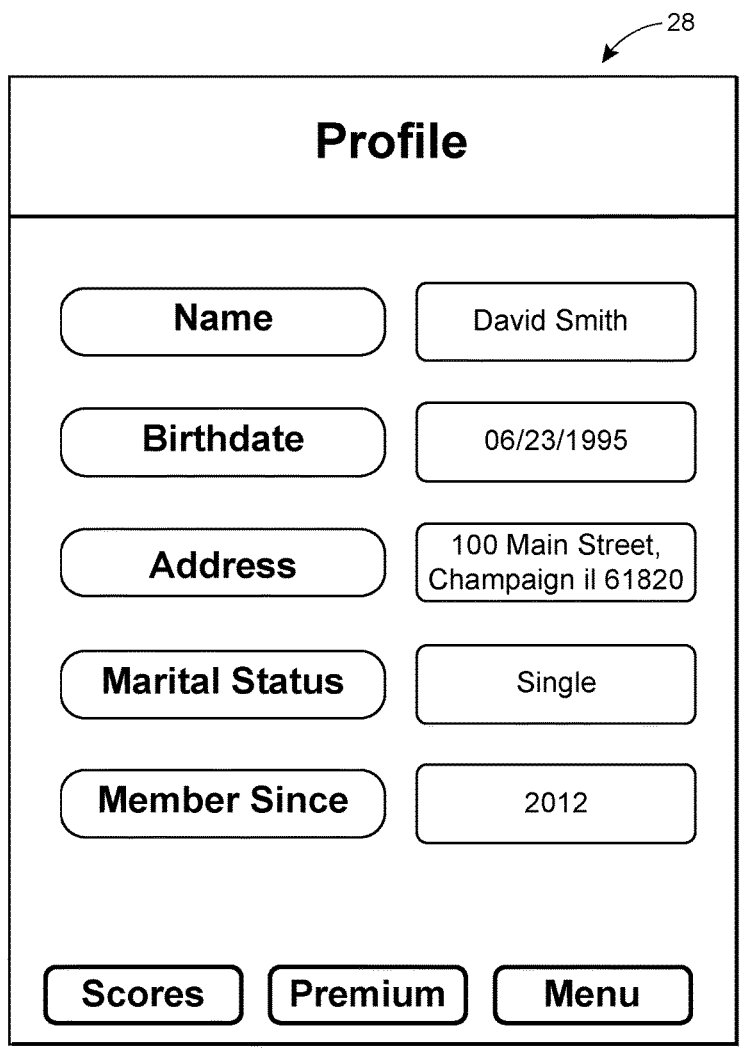
FIG. 10 is another front view of the user control device of the insurance coverage and rating system of FIG. 1, the user control displaying a profile including personal data of the insured that is capable of being changed.

Referring now to FIG. 10, upon selection of the profile listing 56 in FIG. 4, a listing of personal information for the insured user is provided. The listing of personal information may include, but is not limited to, the insured's name, birthdate, address, marital status, and year membership began. The insured can updated any of his or her personal information via this listing of personal information under the profile setting 56.

Figure 11:
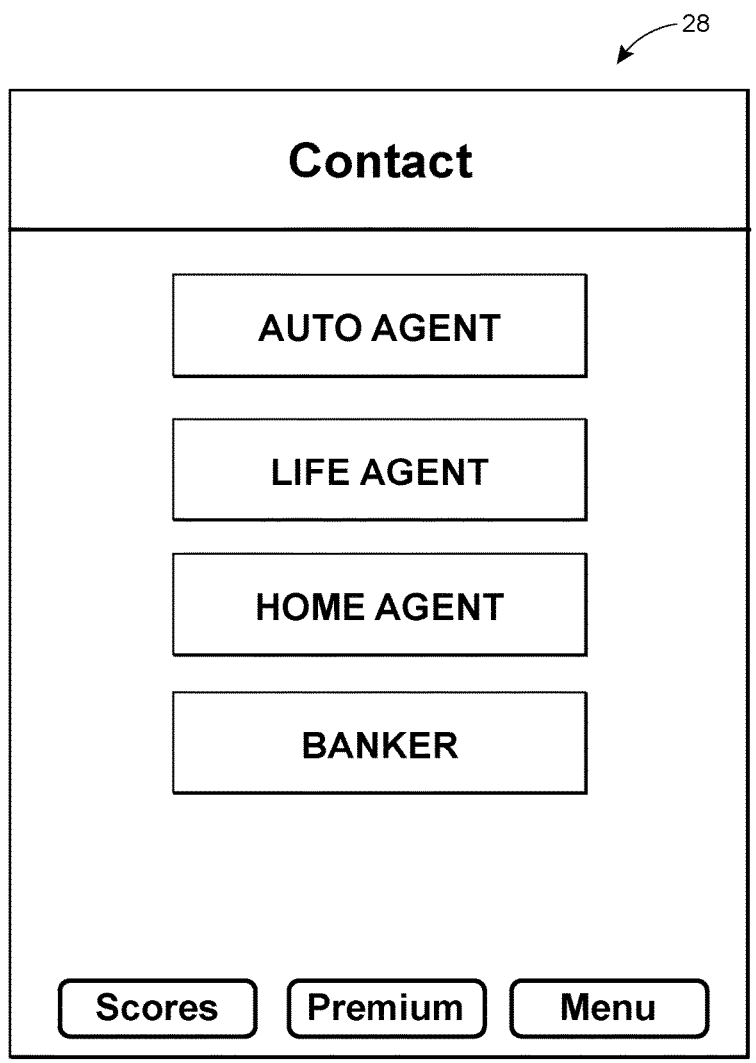
FIG. 11 is another front view of the user control device of the insurance coverage and rating system of FIG. 1, the user control device displaying a listing of contact information for each of an auto insurance agent, a life insurance agent, a home insurance agent, and a banker.

In addition, and referring now to FIG. 11, upon selection of the contact my agent listing 58 of FIG. 4, a listing of contact information relative to each of the relevant agents is displayed. For example, and as depicted in FIG. 11, the contact information for the auto insurance agent, life insurance agent, home insurance agent, and banker is displayed, allowing the user/insured to easily contact via the user control device 28, for example, one or more agents should a personal interaction be desired.

Figure 12:
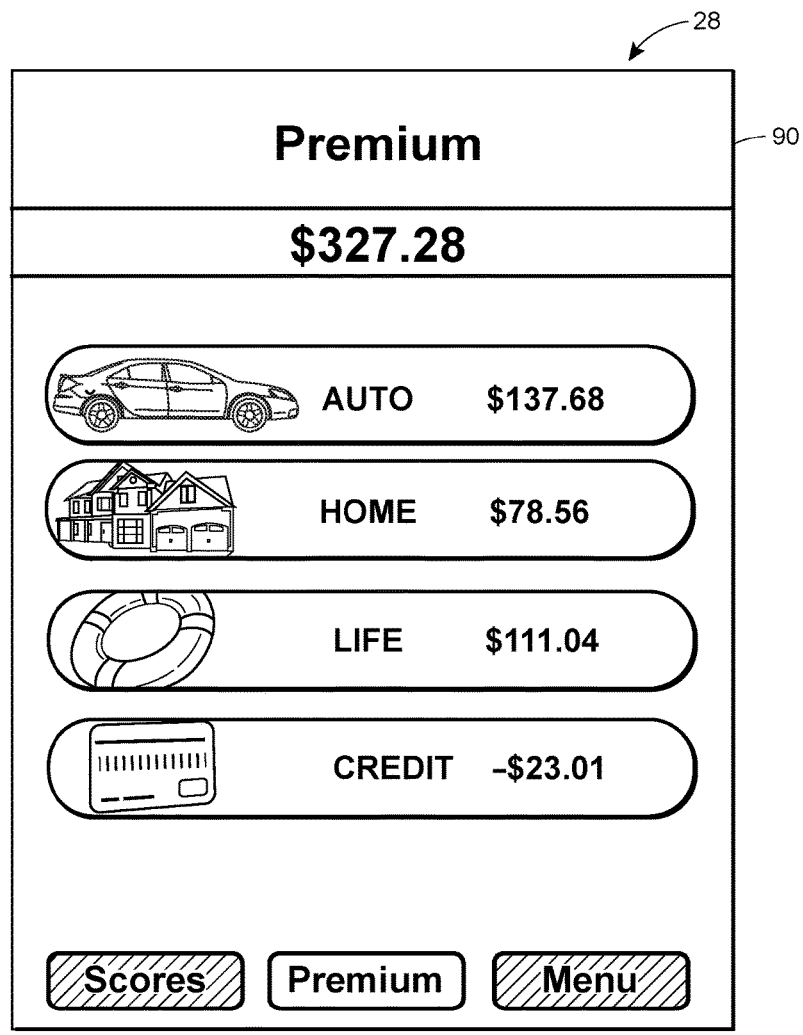
FIG. 12 is another front view of the user control device of the insurance coverage and rating system of FIG. 1, the user control device displaying a total insurance premium calculated from determined insurance rates.

Referring now to FIG. 12, upon selection of a desired coverage amount for each of the automobile insurance coverage, the home insurance coverage, and the life insurance coverage, including a desired term, for example, the user insured may activate one or more data collecting devices 14, 16, 18, 20, 22, 24, 26 (FIGS. 1 and 2). As a result, the total insurance premium calculated is based on both the desired insurance coverages selected by the user and the telematics data collected by the activated one or more data collecting devices, and received by the insurance analysis center 30 (e.g., FIG. 1). FIG. 12 provides one example of a total insurance premium 90 calculated by adding the determined insurance rates for the automobile insurance coverage, the home insurance coverage, the life insurance coverage and the credit score of the insured. The determined insurance rates are based at least in part on the telematics data received from the one or more data collecting devices 14. More specifically, in this example, the determined automobile insurance coverage rate is $137.68, the determined home insurance coverage rate is $78.56, and the determined life insurance coverage rate is $111.04. A credit of $23.01 is further added to each of the automobile, home and life insurance coverage rates based on a determined credit score from telematics data relating to the insured's banking records, for example, allowing the total insurance policy premium 90 of $327.28 to be calculated, in this example.

Figure 13:
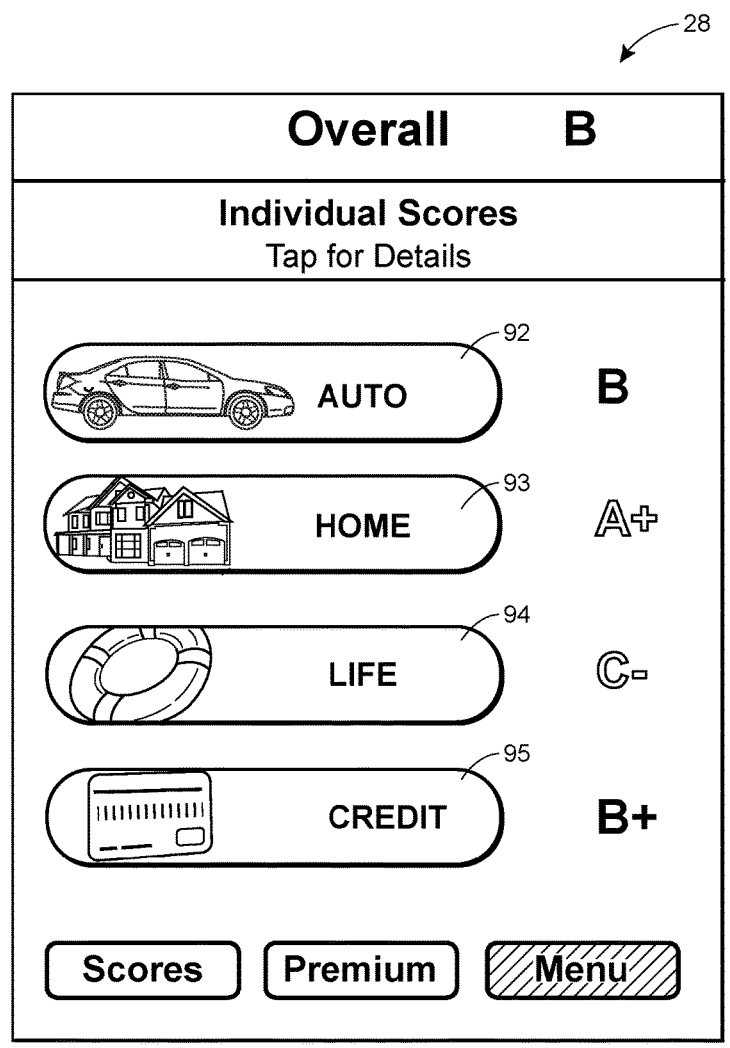
FIG. 13 is another front view of the user control device of the insurance coverage and rating system of FIG. 1, the user control device displaying individual determined scores for each of the automobile, home, and life insurance and a credit score of the insured.

Referring now to FIG. 13, the insured may obtain more information relative to each determined insurance coverage rate to understand how a better score, and ultimately rate, may be obtained, for example. More specifically, and as depicted, individual scores used to determine each of the automobile insurance rate, the home insurance rate, the life insurance rate, and the credit score may be displayed. Said another way, an automobile insurance score 92, a home insurance score 93, a life insurance score 94, and a credit score 95 may be provided. In this example, the automobile insurance score 92 is a B, the home insurance score is an A+, the life insurance score 94 is a C-, and the credit score 95 is a B+. A user may tap one or more of the automobile insurance score 92, the home insurance score 93, the life insurance score 94, and the credit score 95 to obtain more details about how each score was determined and areas for improvement.

Figure 14:
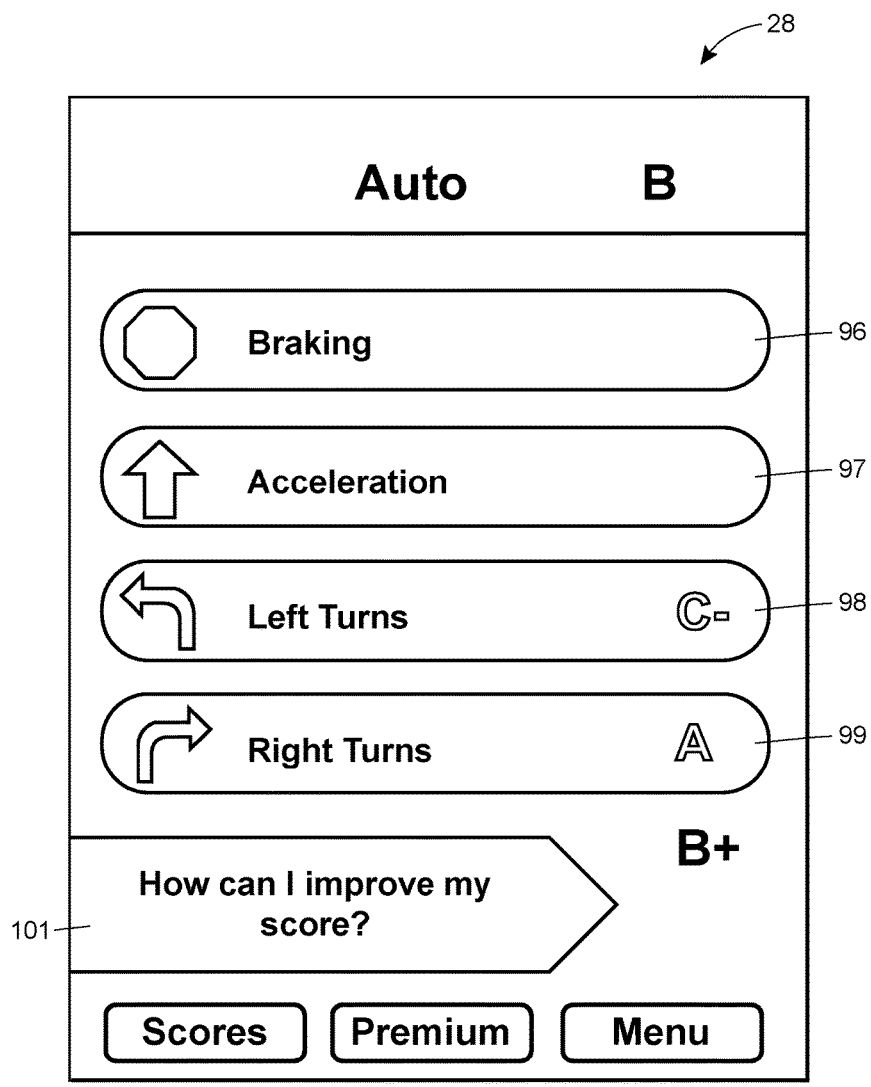
FIG. 14 is another front view of the user control device of the insurance coverage and rating system of FIG. 1, the user control device displaying scores for telematics data received relative to the automobile of the insured.

For example, and referring now to FIG. 14, by tapping on the automobile insurance score 92 of FIG. 13, the insured may receive individual scores for braking patterns 96, acceleration patterns 97, a number of left turns 98, and a number of right turns 99 based on telematics data received from the in-drive device 16 of the insured's automobile 13 (FIG. 1). The individual scores for each of the automobile patterns of the insured then indicate the opportunities for improving one or more of the scores, and, ultimately, the determined insurance rate for the automobile insurance coverage.

Figure 15:
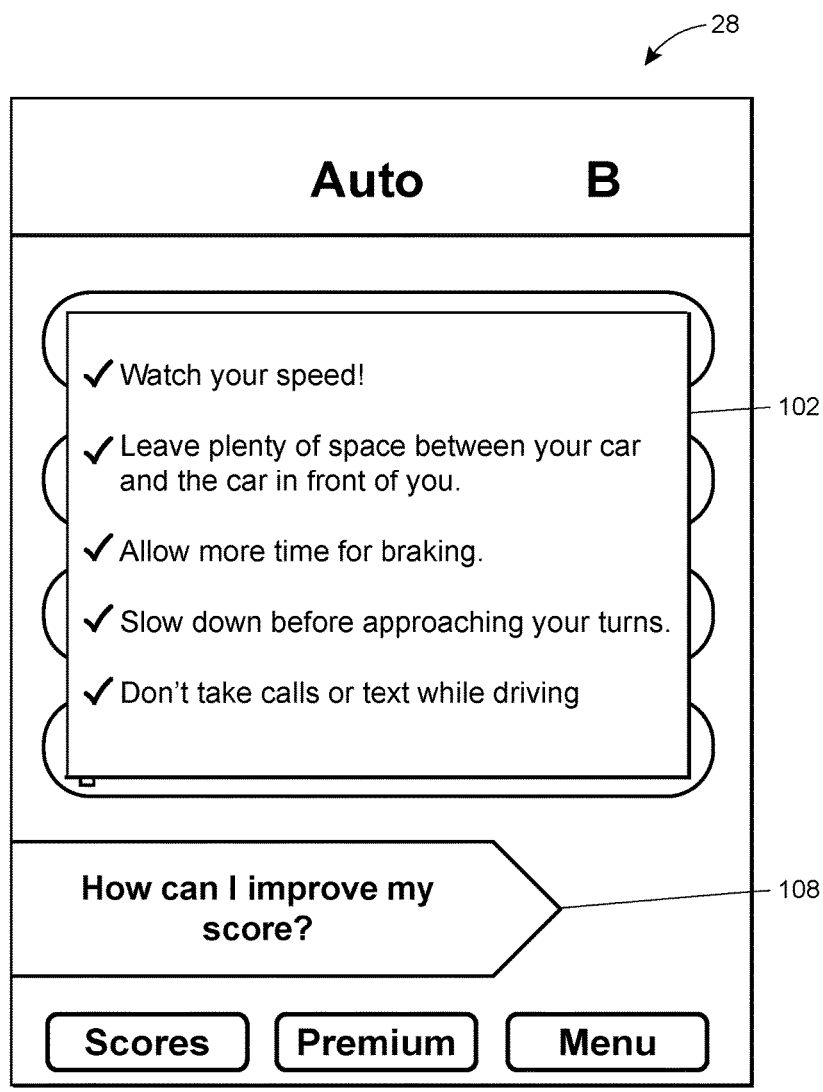
FIG. 15 is another front view of the user control device of the insurance coverage and rating system of FIG. 1, the user control device displaying methods for an insured to improve a determined automobile insurance rating.

In addition, and as further depicted in FIG. 14, the automobile insurance coverage screen also includes an improvement button 101, which may be labeled "How Can I Improve My Score?" Upon actuating, e.g., pressing or tapping, the improvement button 101, a box 102 will appear, detailing actions which may improve one or more scores, as depicted in FIG. 15. More specifically, and as depicted in FIG. 15, the box 102 will indicate that the user can one or more of: (1) watch his or her speed; (2) leave large spaces between the insured's car and the cars in front and around the insured; (3) allow more time for braking; (4) slow down before approaching turns; and (5) not take calls or texts while driving. This allows a user to reflect upon, change, and/or control his or her actions while driving his or her automobile, such that telematics data relating to his or her driving patterns may be improved, ultimately leading to an improved determined automobile insurance coverage rate.

Figure 16:
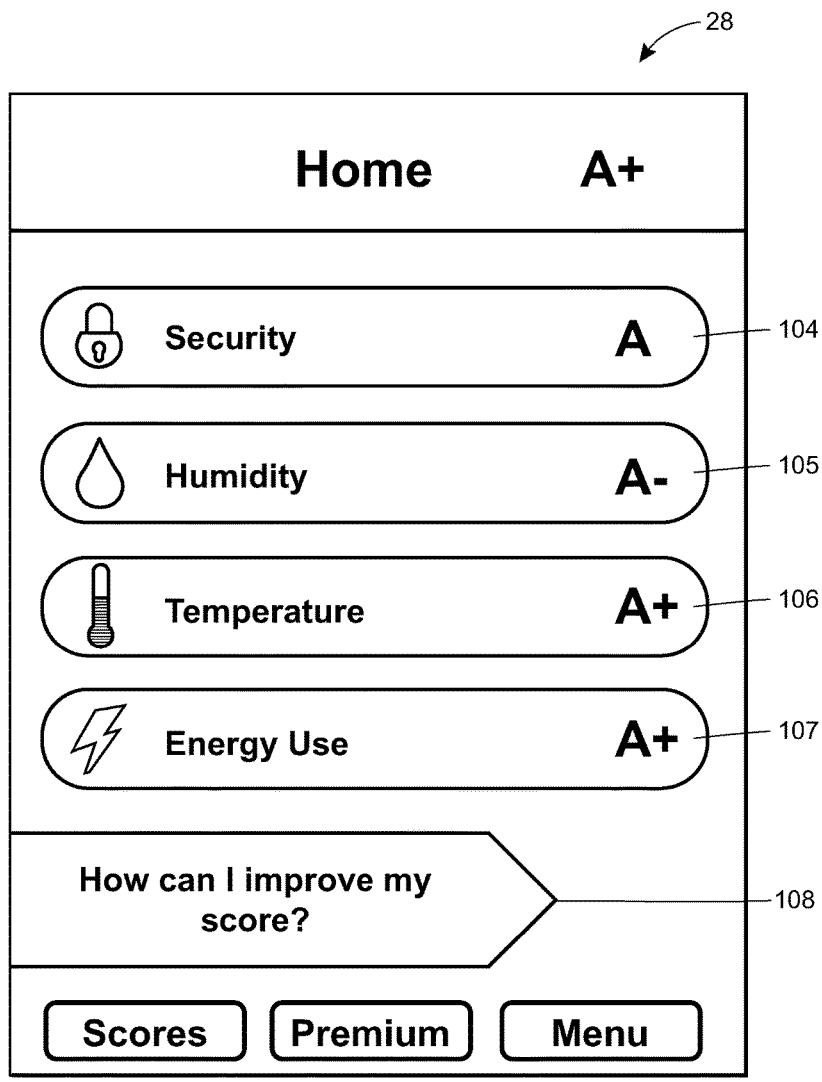
FIG. 16 is another front view of the user control device of the insurance coverage and rating system of FIG. 1, the user control device displaying scores for telematics data received relative to the home of the insured.

Referring now to FIG. 16, the insured may also obtain more information relative to the determined home insurance coverage rate, as depicted in FIG. 16, by actuating the home insurance coverage score tab 93 in FIG. 13. More specifically, and as depicted, upon actuation of the home insurance coverage score 93 in FIG. 13, individual scores for specific features of the insured's home are displayed. In one example, and as depicted in FIG. 16, the user insured may receive individual scores for security 104, humidity 105, temperature 106, and energy use 107 relative to his or her home. Such individual scores are determined, for example, based on telematics data received from a home alarm security system 20 (FIGS. 1 and 2), a thermostat 22 (FIGS. 1 and 2), and/or an energy meter 24 (FIGS. 1 and 2), respectively. In addition, the insured may also learn more about how he or she can improve his or her score by clicking, tapping and/or actuating the improvement score button 108, which may be labeled "How Can I Improve My Score?" as depicted in FIG. 16.

Figure 17:
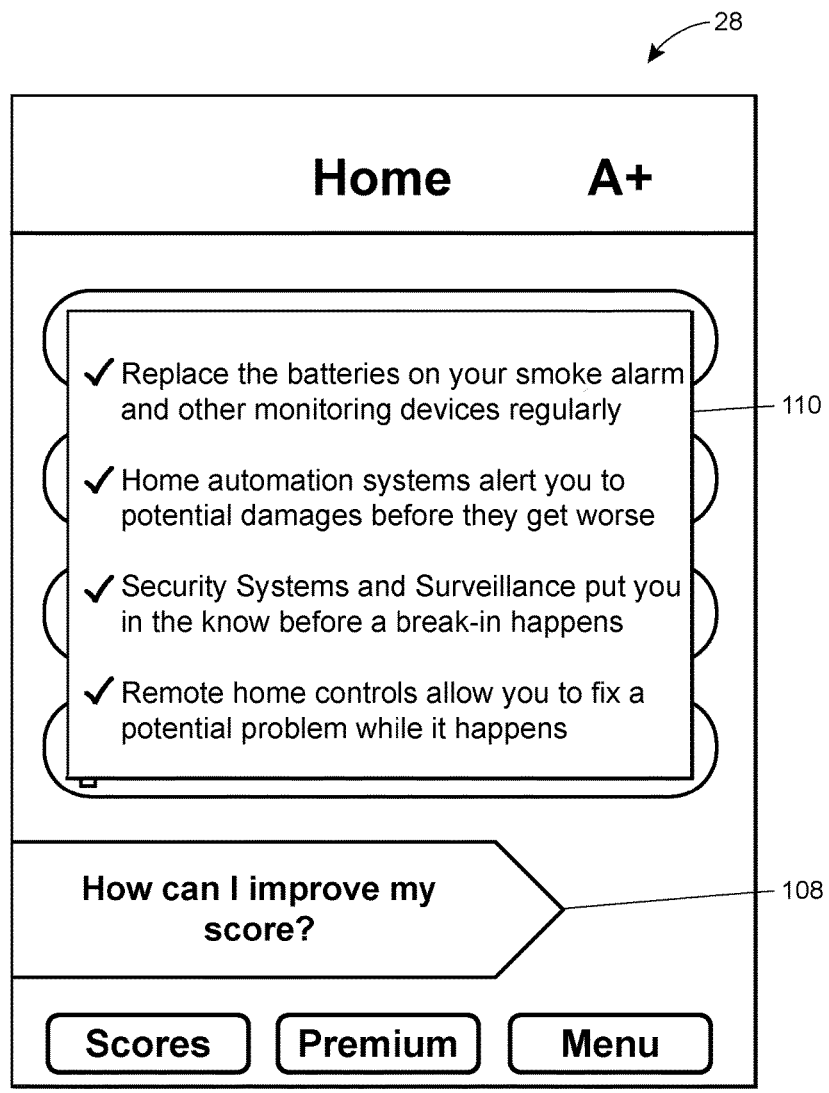
FIG. 17 is another front view of the user control device of the insurance coverage and rating system of FIG. 1, the user control device displaying methods for the insured to improve a determined home insurance rating.

Upon tapping the improvement score button 108, a box 110 will be displayed, as depicted in FIG. 17, detailing actions which may improve one or more scores. More specifically, the box 110 will indicate that the user can one or more of: (1) replace batteries in his or her smoke alarm and other devices regularly; (2) use home automation systems to alert them to potential damages before they get worse; (3) use security systems to alert the insured about trespassers before a break-in occurs; and (4) control one's home remotely to allow the insured to fix a potential problem while it occurs. Such information allows a user to reflect upon, change, and/or control his or her actions and the systems and processes relative to his or her home, such that telematics data relative to his or her home systems and features may be improved, which ultimately improves his or his determined home insurance coverage rate.

Figure 18:
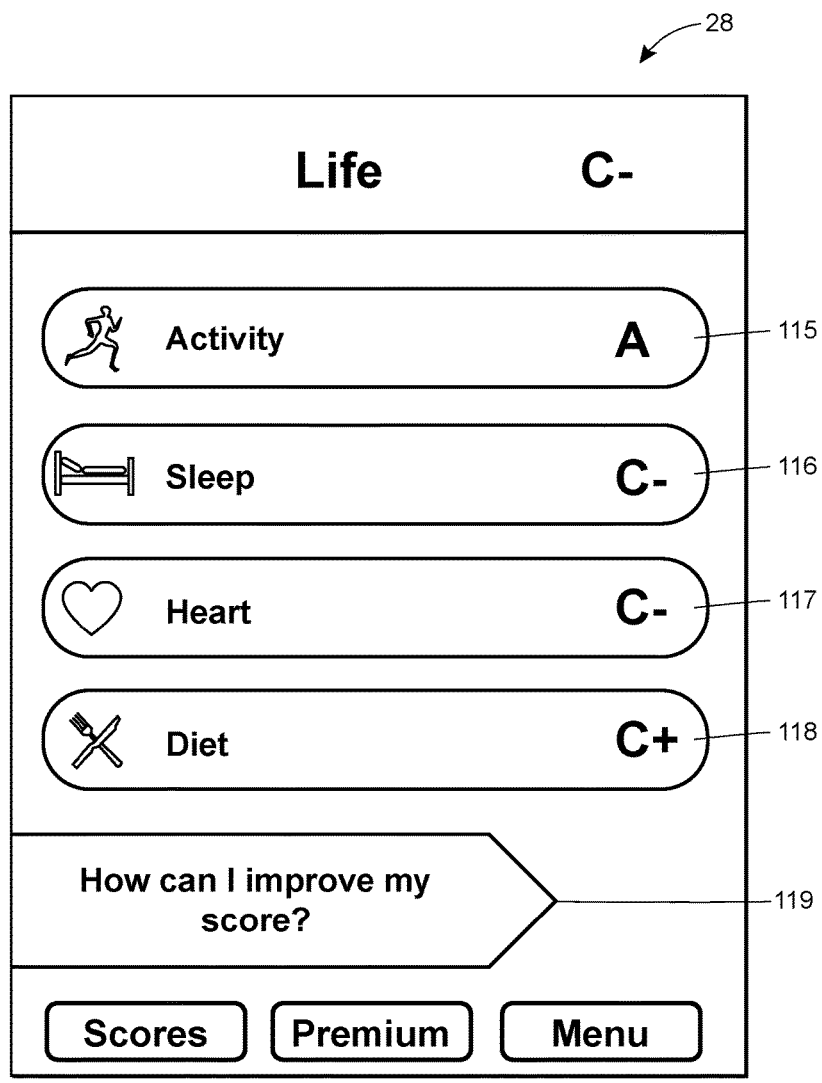
FIG. 18 is another front view of the user control device of the insurance coverage and rating system of FIG. 1, the user control device displaying scores for telematics data received relative to the behaviors of the insured.

Referring now to FIG. 18, the insured may also obtain more information relative to the determined life insurance coverage rate by actuating the life insurance coverage score tab 94 in FIG. 13. More specifically, and as depicted, upon actuation of the life insurance coverage score tab 94 in FIG. 13, individual scores for specific features of the insured's life insurance are displayed. In one example, and as depicted in FIG. 18, the user insured may receive individual scores for his or her activity 115, sleep 116, heart 117, and diet 118 relative to his or her behaviors. Such individual scores are determined, for example, based on telematics data received from the digital fitness product 18 (FIGS. 1 and 2), such as a FitBit. In addition, the insured may also learn more about how he or she can improve his or her score by clicking, tapping and/or actuating an improvement score button 119, which again may be labeled "How Can I Improve My Score," as depicted in FIG. 18.

Figure 19:
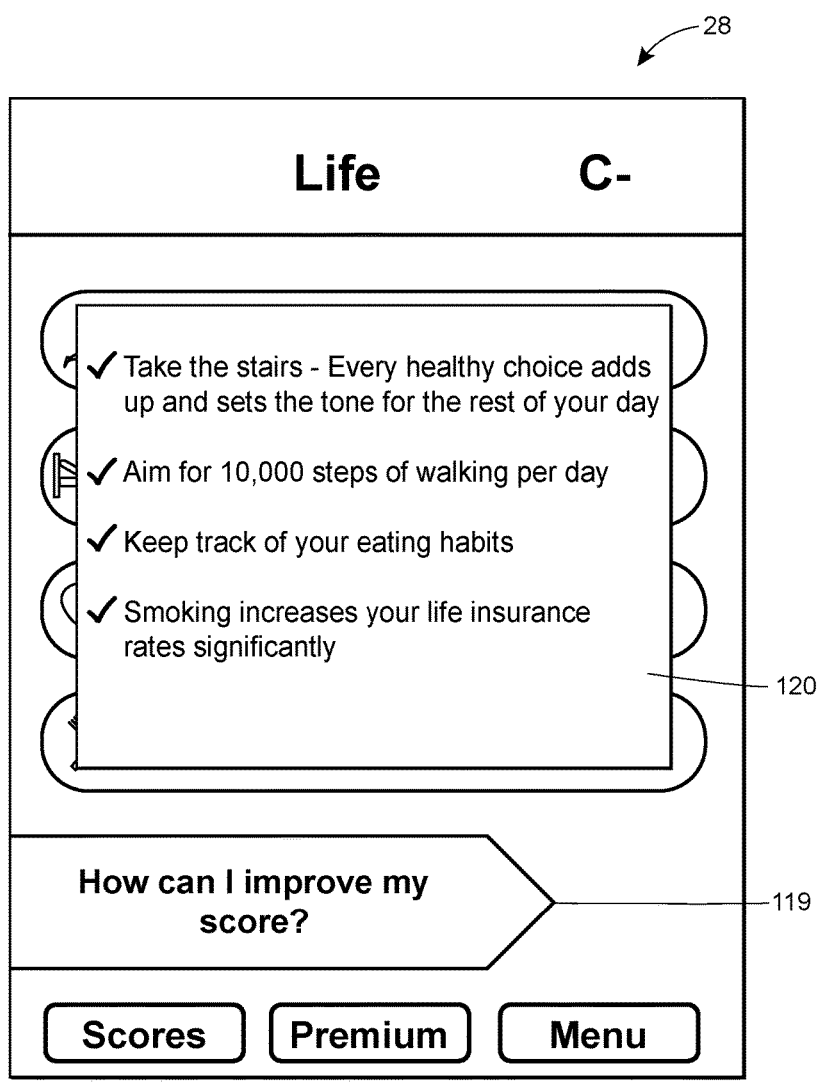
FIG. 19 is another front view of the user control device of the insurance coverage and rating system of FIG. 1, the user control device displaying methods for the insured to improve a determined life insurance rating.

Upon tapping the improvement score button 119, a box 120 will be displayed, as depicted in FIG. 19, detailing actions which may improve the one or more scores. More specifically, the box 120 will indicate that the user can one or more of: (1) take the stairs; (2) aim for 10,000 steps, or other number of steps, per day; (3) keep track of his or her eating habits; and/or (4) quit smoking. Such information allows a user to reflect upon, change, and/or control his or her actions and the systems and processes relative to his or her lifestyle and behaviors, such that telematics data relative to his or her activities and behaviors may be improved, which ultimately improves his or his determined life insurance coverage rate and the total insurance premium 90.

Figure 20:
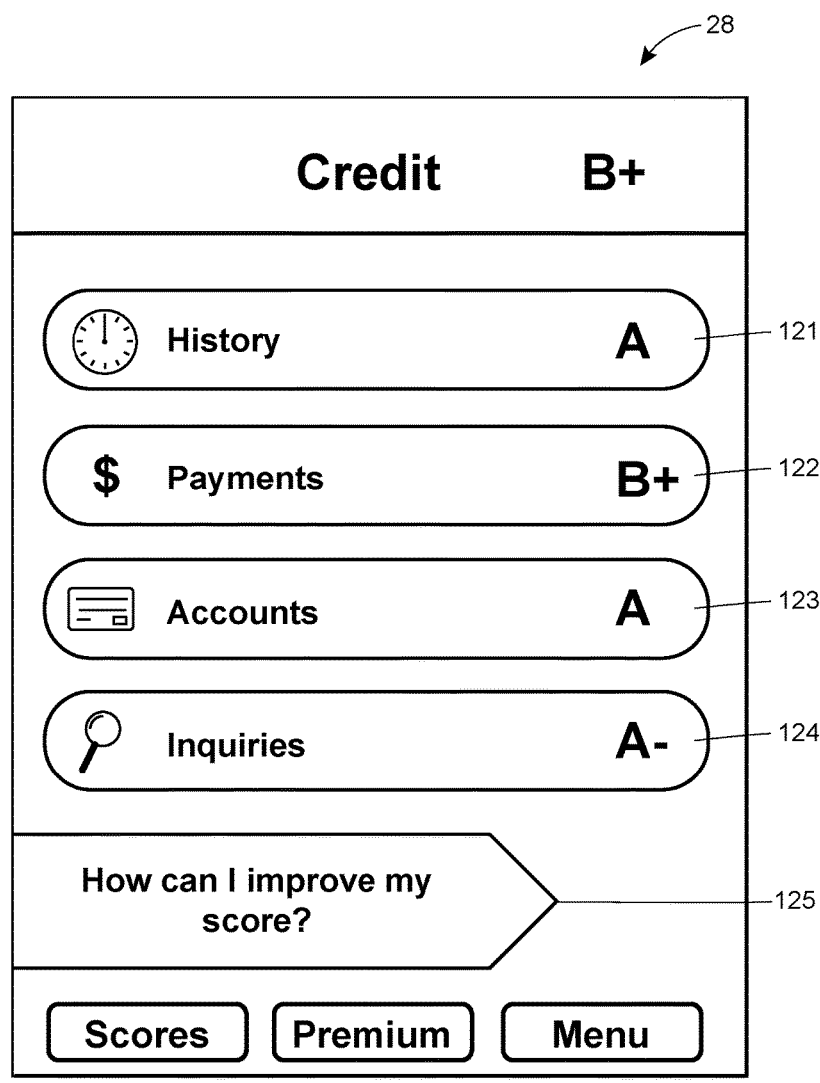
FIG. 20 is another front view of the user control device of the insurance coverage and rating system of FIG. 1, the user control device displaying scores for telematics data received relative to a credit score of the insured.

Referring now to FIG. 20, the insured may also obtain more information relative to the determined credit score by actuating the credit score tab 95 in FIG. 13. More specifically, and as depicted, upon actuation of the credit score tab 95 in FIG. 13, individual scores for specific features of the insured's credit history are displayed. In one example, and as depicted in FIG. 20, the user insured may receive individual scores for his or her credit history 121, timely bill payments 122, bank account maintenance 123, and bank inquiries 124 relative to his or her banking and credit behaviors. Such individual scores are determined, for example, based on telematics data received from the banking record system 26 (FIGS. 1 and 2), for example. In addition, the insured may also learn more about how he or she can improve his or her score by clicking, tapping and/or actuating an improvement score button 125, which again may be labeled "How Can I Improve My Score?," as depicted in FIG. 20.

Figure 21:
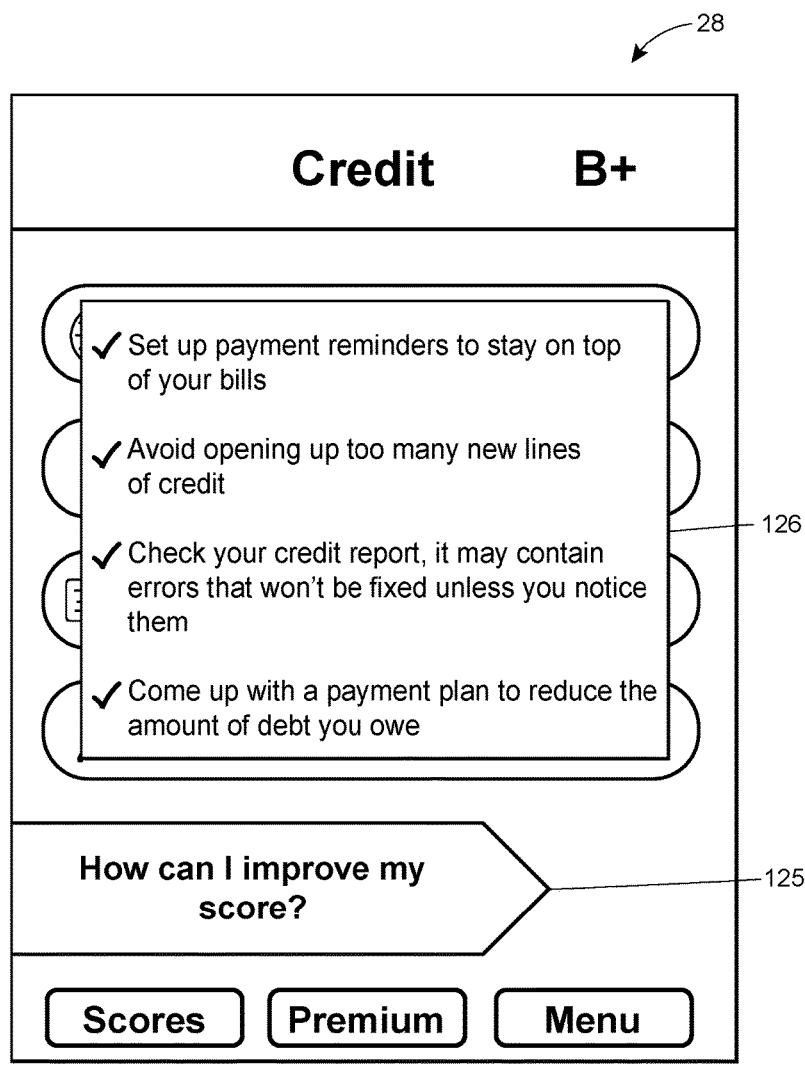
FIG. 21 is another front view of the user control device of the insurance coverage and rating system of FIG. 1, the user control device displaying methods for the insured to improve the determined credit score.

Upon tapping the improvement score button 125, a box 126 will be displayed, as depicted in FIG. 21, detailing actions which may improve the one or more scores. More specifically, the box 126 will indicate that the user can one or more of: (1) set up payment reminders to stay on top of his or her bills; (2) avoid opening too many lines of credit; (3) check one's credit report to correct any errors that may be affecting his or her credit score; and (4) develop a payment plan to reduce amounts of debt owed. Such information allows a user to reflect upon, change, and/or control his or her actions and the systems and processes relative to his or her lifestyle and behaviors, such that telematics data relative to his or her credit behaviors may be improved, which ultimately improves his or her determined credit score.

Figure 22:
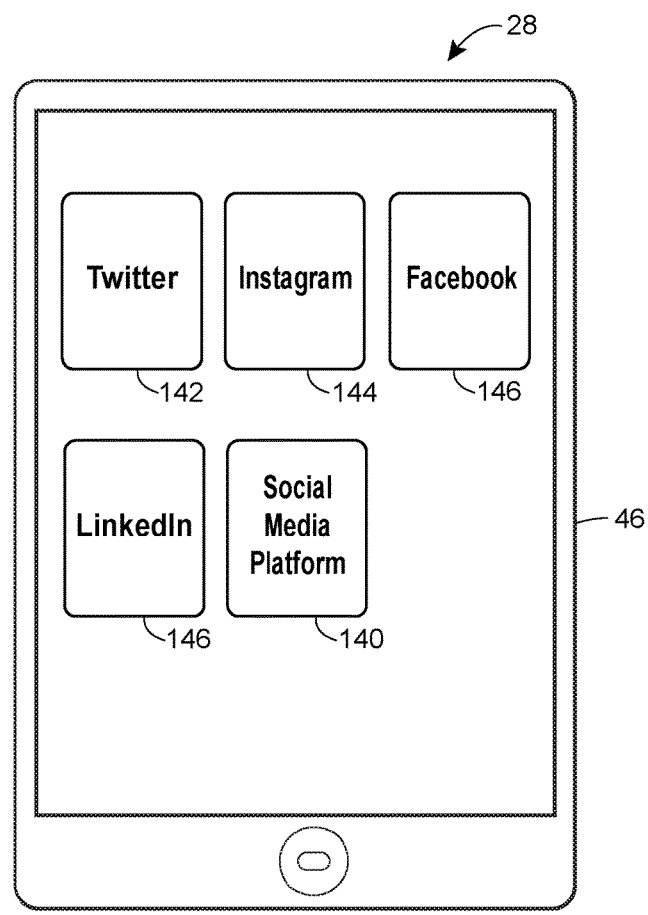
FIG. 22 is another front view of the user control device of the insurance coverage and rating system of FIG. 1, the user control device displaying at least one social media platform of the insured.

Referring now to FIG. 22, another front view of the user control device 28 is depicted. In this example, the user control device 28 is a device capable of supporting at least one social media platform 140, such as a smart phone, a tablet, an e-reader, or similar device. More specifically, while the social media platform 140 is generally represented on the user control device 28, the social media platform 140 may include, but is not limited to, one or more of Twitter 142, Instagram 144, Facebook 146, or LinkedIn 148, for example.

Data from one or more of social media platforms 140, 142, 144, 146 and 148 of the insured, such as data relative to the insured's social media habits, for example, may be collected by the user control device 28. Such data is then transmitted via the user control device 28 to the insurance data analysis center and may be used, at least in part, to predict a risk of the insured related to one or more of home, life, health, or automobile insurance. This data may then ultimately be used to help determine an insurance rate for one or more of a home insurance policy, a life insurance policy, a health insurance policy, and an automobile insurance policy.

Said another way, the insurance data analysis center 30 may receive telematics data from the one or more data collecting devices 14, including the user control device 28, e.g., the smart phone 28 of the insured, in response to activation of the one or more data collecting devices 14, 16, 18, 20, 22, 24, 26, and 28. The insurance data analysis center 30 may then automatically determine an insurance rate for one or more of an automobile policy, a home insurance policy, a life insurance policy, or a health insurance policy based at least in part on the telematics data received from the one or more data collecting devices 14.

Such data may include data from the user control device 28, for example, relating to one or more of the insured's social media platforms 140, 142, 144, 146, 148, e.g., social media habits. More specifically, the social media data may include one or more of: (1) data relating to a location update to the social media platform, such as Twitter and Facebook; (2) web navigation patterns; and (3) social media channels of interactions and preferences, such as employment status, number of children, age, purchasing habits and preferences, how long employed at current employer, sports interests, music interests, fashion interests, cooking interests, and size of friend networks. Although they may not be specifically listed here, one of ordinary skill in the art will appreciate that any other type of social media data may alternatively and/or additionally be used and still fall within the scope of the present disclosure. The insurance data analysis center 30 may then calculate a total insurance premium by adding the determine insurance rates for at least two of the automobile insurance policy, the home insurance policy, the health insurance policy, and the life insurance policy.

Figure 23:
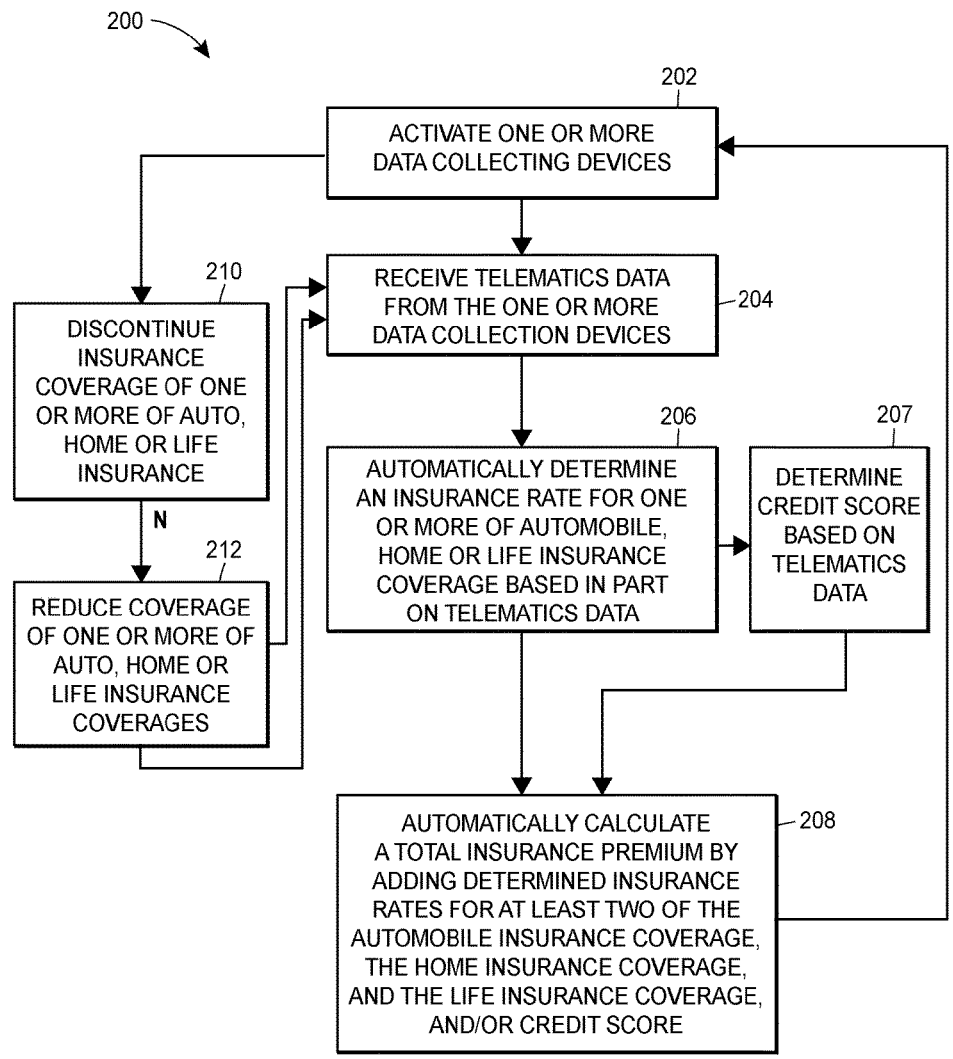
FIG. 23 is an exemplary flow chart depicting a method of one aspect of the present disclosure.

Referring now to FIG. 23, a flowchart of an example insurance coverage and rating method 200 is depicted. The method 200 may be implemented, in whole or in part, on one or more devices or systems such as those shown in the insurance coverage and rating system 10 of FIGS. 1 and 2. The method 200 may be saved as a set of instructions, routines, programs or modules on memory, such as memory 42 of the insurance analysis system 30 (FIGS. 1 and 2), and may be executed by one or more processors, such as the processor 43 of FIG. 2.

The method 200 begins when the one or more data collecting devices 14 is activated by a user via, for example, the user control device 28 (block 202). For example, a user may activate one or more of the data collecting devices 14, including one or more of the in-drive device, the digital fitness product 16, the home alarm security system 18, the thermostat 22, the energy meter 24, the bank records system 26, and/or the user control device 28.

In block 204, the insurance analysis center 30 receives the telematics data from the one or more data collecting devices 14, 16, 18, 20, 22, 24, 26, and 28. As explained, the telematics data may be relative to one or more of the insured's automobile, home or health conditions, for example, along with credit information.

In block 206, the insurance analysis center 30, via one or more processors 42, for example, then automatically determines an insurance rate for one or more of an automobile insurance coverage, a home insurance coverage, and a life insurance coverage based in part on the received telematics data. In one example, the insurance rate for the one or more of the automobile insurance coverage, the home insurance coverage, and the life insurance coverage is determined based on the telematics data received from the one or more data collecting devices 14, 16, 18, 20, 22, 24, 26, and 28, traditional variables, and the consumer rating index (CRI). The traditional variables may include one or more of the age, geographic location, smoking history, and gender of the insured, for example. In another example, the telematics data may be used to calculate the consumer rating index (CRI). In block 207, alternatively and/or additionally, and in one example, the insurance analysis center 30 may further determine the credit score of the insured based at least in part on telematics data relative to the banking records of the insured received from the bank record system 26.

In block 208, the insurance analysis center 30 automatically calculates the total insurance premium 90 (FIG. 12) by adding the determined insurance rates for at least two of the automobile insurance coverage, the home insurance coverage, and the life insurance coverage. If the insurance analysis center 30 further determines the credit score of the insured (block 207), then the total insurance premium 90 may further include not only at least two of the automobile insurance coverage, the home insurance coverage, and the life insurance coverage, but also the determined credit score based at least in part on the insured's telematics data received from one or more of the activated data collecting devices 14, 16, 18, 20, 22, 24, 26, and 28 (Block 208).

In another example, after the one or more data collecting devices 14, 16, 18, 20, 22, 24, 26, and 28 is activated by the insured user, for example, via the user control device 28, the user insured may one or more of discontinue the insurance coverage of one or more of the automobile insurance coverage, the home insurance coverage, and life insurance coverage (Block 210). Upon discontinuing such insurance coverage, the insurance analysis center 30 receives the telematics data from the one or more data collecting devices 14, 16, 18, 20, 22, 24, 26, and 28 along with any input from the user control device 28 regarding discontinuation of the one or more insurance coverages (Block 204), all of which is used to determine the insurance rates in Block 206, for example.

In another example, after the one or more data collecting devices 14, 16, 18, 20, 22, 24, and 26 is activated by the insured user, for example, the insured user may additionally reduce coverage of one or more of the automobile insurance coverage, the home insurance coverage, and the life insurance coverage in Block 212. Upon adjusting or reducing, for example, the coverage of one or more of the insurance policies, the insurance analysis center 30 receives input from the user control device 28 regarding reduction of coverage for the one or more insurance policies. This data regarding the reduction in insurance coverage, along with the telematics data from the one or more data collecting devices 14, 16, 18, 20, 22, 24, 26, and 28 is received in Block 204 and ultimately used to more accurately determine insurance rates in Block 206.

Overall, one of ordinary skill in the art will appreciate the various advantages of the insurance coverage and rating systems and methods of the present disclosure. For example, the insurance coverage and rating system 10 is able to more accurately determine insurance rates for automobile insurance coverage, home insurance coverage, and life insurance coverage based on telematics data from one or more activated data collecting devices 14, 16, 18, 20, 22, 24, 26, and 28 of the insured. Such determined insurance rates more accurately represent the insurance needed for an insured's assets, for example, based on the insured's behaviors and care and condition of his or her assets. Said another way, by using telematics data, the insurance coverage and rating system 10 allows the insured to have significantly more control over insurance rates and ultimately the calculated total insurance policy premium 90, providing a more accurate insurance rate that more accurately captures the insured's risks, for example.

In addition, the insurance coverage and rating systems 10 and method 200, for example, allow an insured to customize the rates and policies by activating the one or more data collecting devices 14, 16, 18, 20, 22, 24, 26, and 28 and selecting, reducing, or eliminating insurance coverage through the user control device 28, for example.

Further, the system 10 and method 200, for example, provide a single all-encompassing, modernized policy. The total insurance policy premium 90 for this single policy is calculated using variables the insured can control, such as how safely and cautiously he or she drives, his or her health and activity levels, and how he or she cares for their home, for example. Using telematics data to determine insurance rates for the at least two of the automobile, home, and life insurance coverages that comprise the total insurance policy are more accurate than using traditional variables, such as the insured's geographic location, age and gender.

The system 10 and the method 200 of the present disclosure will help transform how insurers, e.g., insurance companies, assess risk by analyzing the behavior of the insured individual and the condition and treatment of his or her assets. Through big data and predictive analytics, telematics data relative to the insured's home, health, automobile, life and/or at least one social media platform is used to asses risk more accurately than the traditional insurance rate variables while giving policyholders more control over how and when they are charged.

Certain examples are described herein as including logic or a number of components or modules. Modules may constitute either software modules, e.g., code embodied on a machine-readable medium or in a transmission signal, or hardware modules. A hardware module is a tangible unit capable of performing certain operations and may be configured or arranged in a certain manner. In example embodiments, one or more computer systems, e.g., a standalone, client or server computer system, or one or more hardware modules of a computer system, e.g., a processor or a group of processors, may be configured by software, e.g., an application or application portion, as a hardware module that operates to perform certain operations, as described herein.

In various examples, a hardware module may be implemented mechanically or electronically. For example, a hardware module may comprise dedicated circuitry or logic that is permanently configured, e.g., as a special-purpose processor, such as a field programmable gate array (FPGA) or an application-specific integrated circuit (ASIC), to perform certain operations. A hardware module may also comprise programmable logic or circuitry, e.g., as encompassed within a general-purpose processor or other programmable processor, that is temporarily configured by software to perform certain operations. It will be appreciated that the decision to implement a hardware module mechanically, in dedicated and permanently configured circuitry, or in temporarily configured circuitry, e.g., configured by software, or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods or routines described herein may be fully, or at least partially, processor-implemented. For example, at least some of the operations of a method may be performed by one or more processors or processor-implemented hardware modules.

Unless specifically stated otherwise, discussions herein using words such as "processing," "computing," "calculating," "determining," "presenting," "displaying," or the like may refer to actions or processes of a machine, e.g., a computer, that manipulates or transforms data represented as physical, e.g., electronic, magnetic, or optical, quantities within one or more memories, e.g., volatile memory, non-volatile memory, or a combination thereof, registers, or other machine components that receive, store, transmit, or display information.

In addition, the appended claims are not intended to be construed under 35 U.S.C. § 112(f) unless traditional means-plus-function language is expressly recited, such as "means for" or "step for" language being explicitly recited in the claim(s).

Alternative examples of the structures and methods illustrated herein may be employed without departing from the principles described herein. Thus, while particular examples and applications have been illustrated and described, it is to be understood that the disclosed examples are not limited to the precise construction and components disclosed herein. Various modifications, changes, and variations may be made in the arrangement, operation and details of the method and apparatus disclosed herein without departing from the spirit and scope defined in the appended claims.

What is claimed:

1. An insurance coverage and rating system, the system comprising:
    a communication network and one or more data collecting devices communicatively coupled to the communication network, each of the one or more data collecting devices having a memory, one or more processors, and a transmitter, the data collecting devices collecting telematics data relative to one or more of an automobile, a home, health, or a social media platform of an insured;
    an insurance analysis center communicatively coupled to the one or more data collecting devices of one or more of the automobile, the home, a wearable digital fitness product, or a bank of the insured and the communication network, the insurance data analysis center having one or more of a processor, a memory, a transmitter, or a receiver; and
    a module stored in the memory of the insurance data analysis center and executable by at least the insurance analysis center processor to:
        (1) automatically receive telematics data continuously transmitted from the one or more data collecting devices at a constant interval of time in response to activation of the one or more data collecting devices;
        (2) automatically determine an insurance rate for one or more of automobile insurance coverage, home insurance coverage, or life insurance coverage based at least in part on the continuously transmitted telematics data received from the one or more data collecting devices;
        (3) automatically calculate a total insurance policy premium by adding the determined insurance rates for at least two of the automobile insurance coverage, the home insurance coverage, or the life insurance coverage; and
        (4) automatically and continuously adjust the calculated total insurance policy premium based on continuously transmitted telematics data from one or more of the activated data collecting devices.

2. The system of claim 1, the data collecting devices including one or more of an in-drive device for an automobile, a FitBit, a thermostat, an energy meter, a home alarm, or a user control device, the user control device including one or more of a smart phone, a tablet, a personal computer, or an e-reader.

3. The system of claim 1, further comprising a user control device communicatively coupled to at least one of the data collecting devices and the communication network, the user control device having a memory, and one or more processors, the user control device to activate the one or more data collecting devices.

4. The system of claim 3, wherein the user control device is one or more of a smart phone, a tablet, a personal computer, an e-reader, or any other electronic device capable of sending a command to one or more data collecting devices to activate the one or more data collecting devices, wherein each user control device includes a display having a menu with a listing of the data collecting devices capable of being activated, a listing of the insurance policies capable of being adjusted, and a profile of the insured's personal data.

5. The system of claim 1, wherein the telematics data for the automobile includes one or more of a braking time, a right turn vehicle speed, a left turn vehicle speed, an average speed of the insured's automobile, or a distance between an automobile and one or more of adjacent to, in front of, or behind the insured's automobile.

6. The system of claim 1, wherein the telematics data for the health of the insured includes one or more of activity data, sleep data, heart data, or diet data.

7. The system of claim 1, wherein the telematics data for the home of the insured includes one or more of security data, humidity data, temperature data, or energy use data.

8. The system of claim 1, wherein the total insurance policy premium includes a sum of the determined insurance rate for at least two of the automobile insurance coverage, the home insurance coverage, or the life insurance coverage, and a credit score, the credit score based on telematics data received from one or more data collecting devices corresponding to the insured's banking records.

9. The system of claim 8, wherein the telematics data for the insured's banking records includes one or more of timely bill payment data, open lines of credit data, number of accounts, amount of debt owed, or credit report data.

10. The system of claim 1, wherein the insurance rate for one or more of the automobile insurance coverage, the home insurance coverage, or the life insurance coverage is determined based on the telematics data received from one or more data collecting devices, traditional variables, and a consumer rating index (CRI), the traditional variables including one or more of age, geographic location, smoking history, or gender of the insured.

11. The system of claim 1, wherein the user control device is adapted to one or more of reduce or eliminate insurance coverage for one or more of the automobile insurance coverage, the home insurance coverage, or the life insurance coverage, reducing the calculated total insurance premium.

12. The system of claim 3, wherein the user control device includes a display listing the calculated total insurance policy premium along with a listing of determined insurance rates for one or more of the automobile insurance coverage, the home insurance coverage, or life insurance coverage, and a determined credit score, and wherein individual scores for each of the rates for one or more of the automobile insurance coverage, the home insurance coverage, and life insurance coverage and the credit score may further be provided on the display along with an improvement button for each of the automobile insurance coverage, the home insurance coverage, and life insurance coverage and the credit score.

13. An insurance coverage and rating method, the method comprising:
  activating, via one or more processors, one or more data collecting devices corresponding to one or more of an automobile, a home, health, or at least one social media platform of an insured, the one or more data collecting devices of one or more of the automobile, the home, a wearable fitness product or a bank of the insured;
  automatically receiving, via one or more receivers, telematics data continuously transmitted from the one or more data collecting devices at a constant interval of time upon activation of the one or more data collecting devices, the telematics data corresponding to one or more of the insured's automobile, home, health, or the at least one social media platform;
  automatically determining, by one or more processors, an insurance rate for one or more of automobile insurance coverage, home insurance coverage, or life insurance coverage based at least in part on the continuously transmitted telematics data received; and
  automatically calculating, by one or more processors, a total insurance policy premium by adding the determined insurance rates for at least two of the automobile insurance coverage, the home insurance coverage, or the life insurance coverage.

14. The method of claim 13, further comprising automatically and continuously adjusting, via one or more processors, the determined insurance rate for one or more of the automobile coverage, the home insurance coverage, or the life insurance coverage based on one or more of continuously transmitted telematics data.

15. The method of claim 13, further comprising automatically and continuously updating the total insurance premium, via one or more processors, based on the adjusted determined insurance rates for one or more of the automobile coverage, the home insurance coverage, or the life insurance coverage.

16. The method of claim 13, further comprising discontinuing insurance coverage of one of the automobile insurance coverage, the home insurance coverage or the life insurance coverage via a control device of the insured, thereby reducing a determined insurance rate for one or more of the automobile insurance coverage, the home insurance coverage, or the life insurance coverage.

17. The method of claim 13, further comprising reducing coverage of one or more of the automobile insurance coverage, the home insurance coverage, or the life insurance coverage via a control device of the insured, thereby reducing a determined insurance rate for one or more of the automobile insurance coverage, the home insurance coverage, or the life insurance coverage.

18. The method of claim 13, further comprising providing a menu on a display of a user control device, the menu including a listing of the data collecting devices capable of being activated to collect the telematics data, a listing of insurance coverage capable of being adjusted and/or selected, and a profile of the insured's personal data capable of being updated.

19. The method of claim 13, further comprising receiving, via one or more receivers, telematics data corresponding to banking records of the insured, and determining a credit score based on the received telematics data corresponding to the banking records.

20. The method of claim 19, wherein automatically calculating, by the one or more processors, a total insurance policy premium by adding the determined insurance rates for at least two of the automobile insurance coverage, the home insurance coverage, or the life insurance coverage further comprises automatically calculating a total insurance premium by adding the determined insurance rates for at least two of the automobile insurance coverage, the home insurance coverage, the life insurance coverage and the determined credit score.

21. The method of claim 13, wherein determining the insurance rate for one or more of the automobile insurance coverage, the home insurance coverage, or the life insurance coverage includes determining the insurance rate for one or more of automobile insurance coverage, the home insurance coverage, or the life insurance coverage at least based on the telematics data received from one or more data collecting devices, traditional variables, and a consumer rating index (CRI), wherein the traditional variables include one or more of age, geographic location, smoking history, and gender of the insured.

22. An insurance coverage and rating system, the system comprising:
  a communication network and one or more data collecting devices communicatively coupled to the communication network, the one or more data collecting devices corresponding to an automobile, a home, a wearable digital fitness device, or a bank of an insured; and
  an insurance data analysis center communicatively coupled to the communication network, the insurance data analysis center having one or more of a processor, a memory, a transmitter, and a receiver; and
  a module stored in the memory of the insurance data analysis center and executable by at least the insurance data analysis center processor to:
    (1) automatically receive telematics data relative to one or more of the automobile, the home, or health of an insured, the telematics data continuously transmitted at a constant interval of time from the one or more data collecting devices;
    (2) automatically determine an insurance rate for one or more of automobile insurance coverage, home insurance coverage, or life insurance coverage based at least in part on the telematics data continuously transmitted from the one or more data collecting devices;
    (3) automatically calculate a total insurance policy premium by adding the determined insurance rates for at least two of the automobile insurance coverage, the home insurance coverage, or the life insurance coverage; and
    (4) automatically and continuously adjust the calculated total insurance premium based on continuously transmitted telematics data.

23. The system of claim 22, the data collecting devices including one or more of an in-drive device for an automobile, a FitBit, a thermostat, an energy meter, or a home alarm.

* * * * *